US008231463B2

(12) United States Patent
Wells et al.

(10) Patent No.: US 8,231,463 B2
(45) Date of Patent: Jul. 31, 2012

(54) MODULAR GAMING MACHINE AND SECURITY SYSTEM

(75) Inventors: William R. Wells, Reno, NV (US); Chauncey W. Griswold, Reno, NV (US); Ricky Lew, Reno, NV (US); Christian E. Gadda, Las Vegas, NV (US); Richard L. Wilder, Sparks, NV (US); Harold E. Mattice, Gardnerville, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/251,983

(22) Filed: Oct. 3, 2011

(65) Prior Publication Data

US 2012/0021824 A1 Jan. 26, 2012

Related U.S. Application Data

(63) Continuation of application No. 11/644,148, filed on Dec. 21, 2006, now Pat. No. 8,057,302.

(60) Provisional application No. 60/756,355, filed on Jan. 4, 2006.

(51) Int. Cl.
*A63F 13/00* (2006.01)

(52) U.S. Cl. ................. 463/29; 463/16; 463/20; 463/46

(58) Field of Classification Search .................... 463/29, 463/16, 20, 46
See application file for complete search history.

(56) References Cited

U.S. PATENT DOCUMENTS

| | | | |
|---|---|---|---|
| 3,713,142 | A | 1/1973 | Getchell |
| 4,583,082 | A | 4/1986 | Naylor |
| 5,534,849 | A | 7/1996 | McDonald et al. |
| 5,643,086 | A | 7/1997 | Alcorn et al. |
| 5,761,647 | A | 6/1998 | Boushy |
| 5,907,141 | A | 5/1999 | Deaville et al. |
| 5,912,619 | A | 6/1999 | Vogt |
| 5,923,249 | A | 7/1999 | Muir |
| 5,999,952 | A | 12/1999 | Jenkins et al. |

(Continued)

FOREIGN PATENT DOCUMENTS

| | | |
|---|---|---|
| AU | 2005201254 | 10/2010 |

(Continued)

OTHER PUBLICATIONS

U.S. Office Action dated Aug. 10, 2007 from U.S. Appl. No. 10/810,166.

(Continued)

*Primary Examiner* — Peter DungBa Vo
*Assistant Examiner* — Jeffrey Wong
(74) *Attorney, Agent, or Firm* — Weaver Austin Villeneuve & Sampson LLP

(57) ABSTRACT

A modularized gaming machine operable to receive wagers on a play of a game of chance is described. The modularized gaming machine may include a base gaming module that can operate independently or can be coupled to additional gaming modules. In one embodiment, the base gaming module may include a security monitoring system operable to determine a security configuration including error conditions that depends on features of gaming modules coupled to the base gaming module. In another embodiment, the security monitoring system may be operable to monitor a fixed security configuration that is independent of the configuration of the modularized gaming machine. The fixed security configuration may anticipate input from security devices that are unconnected in a particular configuration of the modularized gaming machine. In these instances, a signal mechanism may provide information to the security monitoring system to ensure a non-error condition for unconnected security devices.

20 Claims, 10 Drawing Sheets

U.S. PATENT DOCUMENTS

| | | | |
|---|---|---|---|
| 6,104,815 | A | 8/2000 | Alcorn et al. |
| 6,106,396 | A | 8/2000 | Alcorn et al. |
| 6,146,274 | A | 11/2000 | Salour et al. |
| 6,149,522 | A | 11/2000 | Alcorn et al. |
| 6,178,510 | B1 | 1/2001 | O'Connor et al. |
| 6,213,277 | B1 | 4/2001 | Blad et al. |
| 6,251,014 | B1 | 6/2001 | Stockdale et al. |
| 6,315,666 | B1 | 11/2001 | Mastera et al. |
| 6,575,833 | B1 | 6/2003 | Stockdale |
| 6,697,903 | B2 | 2/2004 | Massie et al. |
| 6,722,985 | B2 | 4/2004 | Criss-Puszkiewicz |
| 6,773,348 | B2 | 8/2004 | Stockdale |
| 7,112,138 | B2 | 9/2006 | Hedrick et al. |
| 7,515,718 | B2 | 4/2009 | Nguyen et al. |
| 7,892,098 | B2 | 2/2011 | Nguyen et al. |
| 8,057,302 | B2 | 11/2011 | Wells et al. |
| 2002/0019891 | A1 | 2/2002 | Morrow et al. |
| 2002/0138594 | A1 | 9/2002 | Rowe |
| 2003/0054881 | A1 | 3/2003 | Hedrick et al. |
| 2003/0078103 | A1 | 4/2003 | LeMay et al. |
| 2004/0254006 | A1 | 12/2004 | Lam et al. |
| 2005/0054449 | A1 | 3/2005 | Kopera et al. |
| 2005/0215325 | A1 | 9/2005 | Nguyen et al. |
| 2007/0155512 | A1 | 7/2007 | Wells et al. |
| 2008/0254880 | A1 | 10/2008 | Dreyer et al. |

FOREIGN PATENT DOCUMENTS

| | | |
|---|---|---|
| DE | 3601157 | 7/1987 |
| DE | 3802601 | 8/1989 |
| DE | 9101529 | 5/1991 |
| DE | 4140451 | 6/1993 |
| DE | 29713455 | 10/1997 |
| EP | 0436258 | 7/1991 |
| EP | 0738991 | 10/1996 |
| EP | 0978809 | 2/2000 |
| EP | 1039423 | 9/2000 |
| EP | 1197934 | 4/2002 |
| GB | 2393133 | 3/2004 |
| GB | 2412474 | 9/2005 |

OTHER PUBLICATIONS

U.S. Final Office Action dated Jan. 25, 2008 from U.S. Appl. No. 10/810,166.

U.S. Office Action dated Jun. 23, 2008 from U.S. Appl. No. 10/810,166.

U.S. Final Office Action dated Dec. 22, 2008 from U.S. Appl. No. 10/810,166.

U.S. Office Action dated Jun. 4, 2009 from U.S. Appl. No. 10/810,166.

U.S. Office Action dated Dec. 10, 2009 from U.S. Appl. No. 10/810,166.

U.S. Notice of Allowance dated Aug. 9, 2010, from U.S. Appl. No. 10/810,166.

U.S. Notice of Allowance dated Dec. 1, 2010, from U.S. Appl. No. 10/810,166.

U.S. Office Action dated Mar. 5, 2010 from U.S. Appl. No. 11/644,148.

U.S. Office Action dated Jul. 22, 2010 from U.S. Appl. No. 11/644,148.

U.S. Notice of Allowance dated Jul. 5, 2011, from U.S. Appl. No. 11/644,148.

Examination Report from Counterpart Foreign Application No. GB0505252.7, Jul. 13, 2006.

Examination Report from Counterpart Foreign Application No. GB0505252.7, Dec. 21, 2006.

Examination Report from Counterpart Foreign Application No. AU 2005201254, Nov. 26, 2009.

MODULAR GAMING MACHINE AND SECURITY SYSTEM

CROSS-REFERENCE TO RELATED APPLICATION

This application is a continuation of and claims priority to co-pending U.S. patent application Ser. No. 11/644,148, entitled "MODULAR GAMING MACHINE AND SECURITY SYSTEM" filed Dec. 21, 2006, which claims priority to U.S. Patent Application No. 60/756,355, entitled "MODULAR GAMING MACHINE AND SECURITY SYSTEM" filed Jan. 4, 2006, which are incorporated herein by reference in their entirety and for all purposes.

TECHNICAL FIELD

The present invention relates generally to gaming machines and systems, and more specifically to a modular gaming machine and its associated security system.

BACKGROUND

Casinos and other forms of gaming comprise a growing multi-billion dollar industry both domestically and abroad, with electronic and microprocessor based gaming machines being more popular than ever. In a typical electronic gaming machine, such as a slot machine, video poker machine, video keno machine or the like, a game play is initiated through a player wager of money or credit, whereupon the gaming machine determines a game outcome, presents the game outcome to the player and then potentially dispenses an award of some type, including a monetary award, depending upon the game outcome. Many additional gaming machine components, features and programs have been made possible in recent years through this proliferation of electronic gaming machines, including those involving linked progressive jackpots, player tracking and loyalty points programs, and various forms of cashless gaming, among other items. Many of these added components, features and programs can involve the implementation of various back-end and/or networked systems, including more hardware and software elements, as is generally known.

Electronic and microprocessor based gaming machines themselves can include various hardware and software components to provide a wide variety of game types and game playing capabilities, with such hardware and software components being generally well known in the art. A typical electronic gaming machine will have master gaming controller ("MGC"), which includes a central processing unit ("CPU"), that controls various combinations of hardware and software devices and components that encourage game play, allow a player to play a game on the gaming machine and control payouts and other awards. Software components can include, for example, boot and initialization routines, various game play programs and subroutines, credit and payout routines, image and audio generation programs, various component modules and a random number generator, among others. Hardware devices and peripherals can include, for example, bill validators, coin acceptors, card readers, keypads, buttons, levers, touch screens, coin hoppers, player tracking units and the like.

Some gaming machine devices are considered more critical to the gaming machine operations than others, in particular, devices that control the input and output of money from the gaming machine are generally considered critical devices. The master gaming controller, which controls the features of the game played on the gaming machine including the pay-out of a particular game as well as the gaming devices which output game pay-outs, is one of the most critical gaming devices, if not the most critical device. Specific examples of other critical devices include card readers, bill validators, ticket coupon readers, and coin acceptors which control the input of money into the gaming machine and note stackers, token dispensers, drop boxes and ticket/coupon dispensers which control the output of money from the gaming machine.

Access to a particular gaming machine device depends on the type of device. Input devices such as bill validators, coin acceptors, and card readers or output devices such as coupon dispensers or token dispensers are directly accessible. These devices have at least one access mechanism on the outside of the gaming machine so that the gaming machine may either accept money or indicia of credits from players desiring to play the game or pay-out money to a player playing a game. However, access to the mechanisms controlling the operation of these devices is usually behind one or more doors provided on the gaming machine exterior as part of a gaming machine cabinet. The master gaming controller and the money storage devices such as bill stackers and drop boxes are less accessible. These devices are usually only accessible after opening one or more doors or other barriers in the gaming machine cabinet, which limit access to these critical devices.

The doors which allow access to the critical devices are often secured with keyed locks. For security, when any of these doors are opened, the gaming machine must stop normal game play operation and switch to an attention state. Thus, it is necessary to detect whether a door is open or closed via an electronic means so that the operating software utilized by the master gaming controller can take appropriate action.

Another access mechanism to gaming devices including bill validators, coin/token acceptors, token dispensers, master gaming controllers, and coupon dispensers is through wires which accept and transmit signals which control the operation of the device. Typically, during the operation of the gaming machine, many of the associated gaming devices are controlled in some manner by the master gaming controller located within the gaming machine. The control of a gaming device is enabled by the wires, which connect a gaming device to the master gaming controller. For example, when a player is playing a game and receives a pay-out during the course of a game, the master gaming controller may send out a signal to a coupon dispenser, located in some of other part of the gaming machine away from the master gaming controller, instructing the coupon dispenser to dispense a coupon representing the pay-out. Thus, access may be gained to a gaming device, via the wires connected to the gaming device.

A mode of theft for gaming machines involves accessing the devices which control the input and output of money to the gaming machine through some access mechanism and manipulating the devices in some manner to obtain an illegal pay-out. For example, one type of theft might involve simply taking money from a drop box while a gaming machine is being accessed for maintenance. Another type of theft might involve illegally gaining access to the master gaming controller and reprogramming the master gaming controller to pay-out an illegal jack pot. Another type of theft might involve compromising the wires to a coupon dispenser and sending a signal instructing it to dispense coupons with some monetary value.

One method for preventing theft is installing a security system, which monitors the various access mechanisms of a gaming machine. Typically, security devices of this type monitor access to the various entry ports within the gaming machine as well as the wires to some gaming devices. The security system monitors access to the entry port by sending out signals to sensors able to detect whether access to the entry port has occurred. Usually, the entry port contains a sensor device that forms some type of closed circuit when the entry port is closed and an open circuit when the entry port is open. When an entry port is opened, some information regarding this event is stored by the security monitoring system. For example, the security monitoring system might store information regarding whether a particular entry port was accessed during a particular period of time. This information can be used to determine when a theft has occurred or when tampering with the gaming machine has occurred.

Security monitoring of access to the gaming machine is usually implemented in some manner by the master gaming controller during normal operations of the gaming machine in conjunction with some security monitoring hardware independent of the master gaming controller. The security monitoring by the master gaming controller is implemented while the gaming machine is receiving power from an external power source such as AC power from a power outlet. In the event the gaming machine is receiving no external power such as during a power failure or when the gaming machine is being stored or shipped, security monitoring of the gaming machine is carried out only by the independent security monitoring hardware powered by an internal power source within the gaming machine such as battery.

It is a desire in the gaming industry to provide flexibility in regards to the features and devices that a gaming machine incorporates. For instance, some gaming machines are compatible with top boxes that allow the features and the devices of a base gaming machine to be expanded. The top boxes sits on top of the main cabinet to the gaming machine. Typically, the top box does not include critical devices, such as coin or bill acceptors that are monitored by the security system. Therefore, the security requirements and the security system for the gaming machine are defined by the access points designed into the main cabinet of the gaming machine and the critical devices incorporated into the main cabinet.

For the traditional design described above, one disadvantage is that the critical access points to the gaming machine and its associated security system, such as the main door to the main cabinet, associated locks and monitoring devices for the main door and locks, are fixed. The main door provides a single critical access point to the gaming machine that is fixed. This limits the configurability of the gaming machine because it requires critical devices to be accessible via the main door and within the main cabinet of the gaming machine. Thus, it can be appreciated that what is needed are gaming machine designs that are not limited to a single critical access point.

SUMMARY

The present invention addresses the need describe above by providing a modularized gaming machine operable to receive wagers on a play of a game of chance. The modularized gaming machine may include a base gaming module that can operate independently or can be coupled to additional gaming modules. The base gaming module may be designed to provide one set of gaming features including wagering on a game of chance when it is operating in a "stand-alone" mode.

For example, in a particular embodiments, the base gaming module may be designed so that it can be mounted to a bar-top. The base gaming module may include a card reader for player identification and cash-in/cash-out purposes. The base gaming module may not include coin-in/coin-out capabilities. The base gaming module may be designed so that it can be mounted to a second gaming module. The second gaming module may be designed to provide coin-in/coin-out capabilities. Further, the second gaming module may be designed so that it is mountable to a third gaming module. The third gaming module may include a pedestal.

A modularized gaming machine comprising a base gaming module coupled to a second gaming module and a third gaming module with a pedestal may operate in a free-standing mode on a floor. Thus, in operation, it may be possible to first mount a base gaming module to the bar-top and then, later remove the base gaming module and couple it additional gaming modules to provide a free standing configuration. The modularized gaming machine may be operable to allow communications with remote devices, such as remote servers or other gaming machines, when so desired.

Different configurations of the modularized gaming machines may have different security monitoring requirements. In one embodiment, the base gaming module may include a security monitoring system operable to determine a security configuration including error conditions that depend on features of gaming modules coupled to the base gaming module. The security monitoring system of the base gaming module may dynamically adjust itself according to the security monitoring requirements for the critical devices and access ports of a particular modularized gaming machine configuration.

In another embodiment, the security monitoring system in the base gaming module may be operable to monitor a fixed security configuration that is independent of the configuration of the modularized gaming machine. The fixed security configuration may anticipate input from security devices that are unconnected in a particular configuration of the modularized gaming machine. In these instances, a signal mechanism may provide information to the security monitoring system to ensure a non-error condition for unconnected security devices. A mechanical jumper is one type of device that may be used to generate the non-error condition.

As an example, the fixed security configuration may be designed to monitor four access ports to the modularized gaming machine. Some configurations of the modularized gaming machine may include four access ports that are each equipped with security devices while other configurations may include less than four access ports. For modularized gaming machine configurations that utilize less than four access ports, the security monitoring system with the fixed security configuration may be designed to anticipate input from four security devices and operate assuming all four of the security devices are providing input even though one or more of the security devices are not connected. Thus, for the one or more security devices that are not connected, a signal mechanism may be used, such as a mechanical jumper, that provides a signal to the security monitoring system indicating the unconnected security devices are operating normally and without error.

A door is one example of an access port. The door may be located on the exterior of the modularized gaming machine and provide an "external" access port to the interior of the modularized gaming machine. The external access port is one type of access port. A module incorporated to the modularized gaming machine may or may not include an external access port, such as a door. Within the interior of a module of a modularized gaming machine, one or more compartments with limited access may be provided. For example, a CPU box with a lockable door may be provided within the interior of the base game module to limit access to the CPU. The lockable door may be considered an "internal" access port.

The internal access port is another example of an access port that may be provided with a modularized gaming machine.

One aspect of the present invention provides a modularized gaming machine including a base gaming module for receiving a wager on a game of chance. The modularized gaming machine may be generally characterized as comprising a base gaming module. The base gaming module may comprise: 1) a master gaming controller operable to generate the game of chance and to respond to error conditions; 2) a video display for presenting the game of chance; 3) an input device for receiving inputs to play the game of chance; 4) a power interface for receiving power from an external power supply; 5) a mechanical interface for coupling the base gaming module to a surface; 6) at least a first security device located in the base gaming module; 7) a security system operable to anticipate information from a fixed number of security devices including the first security device wherein, while the gaming machine is available for game play, the security system is designed to determine whether error conditions have occurred using the anticipated information from each of the fixed number of security devices; 8) a signal mechanism operable to provide information to the security system indicating a non-error condition for at least a second security device when the second security device is not coupled to the gaming machine wherein the second security device is one of the fixed number of security devices from which the security system is operable to anticipate information; and 9) a communication interface operable to allow communications between the base gaming module and a second gaming module when the second gaming module is coupled to the base gaming module wherein the second security device is located in the second gaming module. The signal mechanism may be located in the base gaming module or may be coupled to the base gaming module as needed.

In particular embodiments, the input device may be reconfigurable. For example, the input device may be a touchscreen display operable to display different button configurations or a mechanical input device with button switches where the button switches include labels using electronic ink or other display technologies that are dynamically configurable. The input device may also comprise a combination of mechanical input switches, displays and touch activated areas. Further, the video display may include touchscreen sensors for inputting information or making selections on the gaming machine.

The gaming machine may further comprise at least one audio output device, such as a speaker, head-phone jack or wireless interface. In addition, the gaming machine may further comprise a card reader. The card reader may be operable to accept and interrogate at least one of a smart card, a credit card, a debit card and a player tracking card. The card reader may be also operable to write to an instrument such as a smart card.

In yet other embodiments, the gaming machine may further operable to send and/or receive information from a device via wireless technology, such as an RFID tag, a cell phone, a wireless transponder, a personal digital assistant or a remote server. The communication interface, which may use wireless or wired technologies, may be operable to allow communications with at least one of a server and the additional gaming module. Further, the base gaming module may be operable to communicate with at least one additional peripheral device.

In additional embodiments, the surface may comprise a first mechanical interface for coupling the base gaming module to the surface. The surface may be a portion of a stationary object, such as a table, a pedestal or a counter top. The surface may be a horizontal surface, vertical surface or a slanted surface. The stationary object may include hardware and or software disposed within or coupled to the stationary object that allows the base gaming module to communicate with a remote gaming device and/or to receive power. The remote gaming device may be a server, a hand-held device or another gaming machine.

In one embodiment, the second gaming module may comprise i) a wager input device; ii) a communication interface; iii) a first mechanical interface for coupling the second gaming module to the base gaming module; iii) a second mechanical interface for coupling the second gaming module to a stationary object or a third gaming module; and iv) the second security device operable to provide information to the security system where the signal mechanism is adapted not to generate the non-error condition for the second security device when the second gaming module is coupled to the base gaming module and where the security system is operable to anticipate information from the second security device when the second security device is not communicatively coupled to the base gaming module.

In yet other embodiments, the second gaming module may further comprise a display. The first and second mechanical interfaces may be substantially identical. The wager input device may be at least one of a card reader, a bill acceptor, a ticket reader, a bar-code reader, a coin acceptor or combinations thereof. The card reader may be operable to accept and interrogate at least one of a smart card, a credit card, a debit card and a player tracking card. The card reader may be also operable to write to an instrument such as a smart card.

In additional embodiments, the gaming machine may comprise a third gaming module that may be coupled to the second gaming module. The third gaming module may comprise 1) the first surface; 2) a third communication interface; 3) a third mechanical interface for coupling the third gaming module to the second gaming module; 4) a third security device wherein the third security device is operable to provide information to the security system wherein the security system is operable to anticipate information from the third security device when the third security device is not communicatively coupled to the base gaming module.

The signal mechanism may be operable to generate the non-error condition for the third security device when the third gaming module is not communicatively coupled to the base gaming module and may be adapted not to generate the non-error condition for the third security device when the third gaming module is communicatively coupled to the base gaming module. Further, the signal mechanism may include a mechanical jumper. A first portion of the mechanical jumper may be disengaged or engaged when the base gaming module, the second gaming module and third gaming module are communicatively coupled to one another. A different portion of the mechanical jumper may be disengaged or engaged when only the base gaming module and the second gaming module are communicatively coupled.

In particular embodiments, the third gaming module may be operable to communicate with at least one additional peripheral device. Further, the master gaming controller may communicate with a remote server or another gaming machine via a network interface located in the third gaming module. Further, the third gaming module may include a second security system adapted for monitoring the third security device, one more security devices located in the third gaming module or combinations thereof. In addition, the third gaming module may include a value output device, wherein the value output device is at least one of a token dispenser, a printer, a card dispenser, a card-crediting device or a device operable to alter an electromagnetic state stored on an instrument wherein the electromagnetic state is used to record a value.

Another aspect of the present invention provides a gaming machine including a base gaming module for receiving a wager on a game of chance. The base gaming module may be generally characterized as comprising: 1) a master gaming controller adapted for controlling the game of chance played on the gaming machine and for responding to error conditions; 2) a video display for presenting the game of chance; 3) an input device for receiving inputs to play the game of chance; 4) a mechanical interface for coupling the base gaming module to a surface; 5) a power interface; 6) one or more security devices located in the base gaming module; 7) an interface for receiving information generated from one or more security devices located outside of the base gaming module; 8) a security system operable to a) determine a security configuration of the gaming machine wherein the security configuration includes a list of security device from which to anticipate information, b) configure the error conditions of the gaming machine according to the determined security configuration of the gaming machine and c) while the gaming machine is available for game play, determine whether error conditions have occurred using the anticipated information from security devices in the determined security configuration. The surface to which the base gaming module is mounted may be located on one of a table, a pedestal, a wall, a counter top or a second gaming module. Also, the interface and the power interface may be a single integrated interface.

In particular embodiments, the input device may be a touch screen display. The base gaming module may comprise 1) at least one audio output device, 2) a card reader, where the card reader is operable to accept at least one of a smart card, a credit card, a debit card and a player tracking card, 3) a communication interface operable to allow communications between the base gaming module and a second gaming module when the second gaming module is coupled to the base gaming module where the second gaming module includes at least a first security device and where the security system anticipates information from the first security device when the second gaming module is coupled to the base gaming module and where the security system does not anticipate information from the first security device when the second gaming module is not coupled to the base gaming module and 4) a network interface operable to communicate with a remote gaming device, such as a remote server or another gaming machine.

In addition, the base gaming module and may further comprise: 1) an access port where the first security device is operable to provide information to the security system indicating a status of the access port, 2) a lock where a first security device is operable to provide information to the security system indicating a status of the lock and/or 3) a peripheral device, such as a card reader/writer where the first security device is operable to provide information to the security system indicating a status of the peripheral device.

The base gaming module may further comprise 1) an upper casing including the video display, 2) a lower casing including the input device and 3) a mechanism operable to couple the upper casing to the lower casing. The mechanism may be operable to provide one or more degrees of freedom of movement of the upper casing relative to the lower casing. Further, the mechanism may be a hinge mechanism for allowing an angle between the upper casing and the lower casing to be altered.

As described above, the base gaming module may be operable to be coupled to a second gaming module. The second gaming module may comprises: 1) a wager input device; 2) a communication interface for allowing communications between the base gaming module and the second gaming module where the communication interface is compatible with the interface on the base gaming module; 3) a first mechanical interface for coupling the second gaming module to the base gaming module; 4) a second mechanical interface for coupling the second gaming module to a first surface; 5) at least one security device operable to provide information used by the security system in the base gaming module.

In particular embodiments, the security system may be operable to reconfigure the security configuration of the gaming machine including the error conditions when the second gaming module is coupled to the base gaming module. The master gaming controller may be operable to reconfigure the tilt conditions for the gaming machine when the base gaming module is connected to the second gaming module. The wager input device may be at least one of a card reader, a bill acceptor, a ticket reader or a coin acceptor. The card reader may be operable to accept at least one of a smart card, a credit card, a debit card and a player tracking card. Also, a display may be coupled to the second gaming module.

The first surface to which the second gaming module may be mounted can be a table, a counter top, a pedestal, a wall, a floor or an exterior surface of a third gaming module. The second gaming module may further comprise 1) a value output device, where the value output device is at least one of a token dispenser, a printer, a card dispenser, a card-crediting device or a device operable to alter an electromagnetic state stored on an instrument wherein the electromagnetic state is used to record a value on the instrument, 2) a power supply operable to provide power to the base gaming module via the power interface, 3) a first security system for monitoring one more security devices located in the second gaming module where the first security system is operable to communicate security information to the security system in the base module when the second gaming module and the base gaming module are coupled and 4) a network interface wherein the master gaming controller is operable to communicate with a remote gaming device via the network interface.

A third gaming module may be coupled to the second gaming module or the base gaming module. The third gaming module may comprise: 1) a first surface to which another gaming module may be mounted, 2) a first communication interface for communicatively coupling the second gaming module and the third gaming module; 3) a third mechanical interface for mechanically coupling the third gaming module to the second gaming module and 4) a third security device operable to provide information to the security system in the base gaming module.

The third gaming module may comprise: a) an access port for allowing access to an interior of the third gaming module where the third security device is operable to provide information to the security system indicating a status of the access port, b) a power supply where the third security device is operable to provide information to the security system indicating a status of the power supply, c) a lock where the third security device is operable to provide information indicating a status of the lock and d) a peripheral device, such a bill stacker or a drop box, where the third security device is operable to provide information indicating a status of the peripheral device. The second gaming module may also comprise access ports, a power supply, lock and peripheral devices that are monitored by security devices that provide information to the security system.

Another aspect of the present invention provides a method in a modularized gaming machine operable to provide wagering on a game of chance. The method may be characterized as comprising: 1) providing a base gaming module for the modularized gaming machine where the base gaming module is operable to provide wagering on the game of chance, includes a security system operable to anticipate information from a fixed number of security devices including at least a first security device located in the base gaming module and is operable to be coupled to additional gaming modules; 2) for a second security device located in one of the additional gaming modules where the security system is operable to anticipate information from the second security device, generating information in a signal mechanism coupled to the modularized gaming machine indicating a non-error condition for the second security device when the second security device is not communicatively coupled to the security system; 3) receiving the information from at least the first security device and the signal mechanism; 4) determining whether an error condition has occurred using the information received from the first security device and the signal mechanism; and 5) controlling a play of the game of chance on the modularized gaming machine.

The method may further comprise one or more of: 1) connecting a second gaming module to the base gaming module wherein the connection is operable to allow at least the second security device located in the second gaming module to provide information to the security system and stopping the generation of the non-error condition for the second security device in the signal mechanism, 2) determining an error condition has occurred and generating a tilt condition in the modularized gaming machine and 3) in response to the tilt condition, disabling game play on the modularized gaming machine. In particular embodiments, the first security device may be operable to monitor one or more of a status of an access port, a lock, a status of a power supply, a status of a peripheral device coupled to the gaming machine. Further, the signal mechanism may be a mechanical jumper.

Another aspect of the present invention provides a method in a modularized gaming machine operable to provide wagering on a game of chance. The method may be generally characterized as comprising: 1) providing a base gaming module for the modularized gaming machine where the base gaming module is operable to provide wagering on the game of chance, includes a security system operable to anticipate information from a variable number of security devices including at least a first security device located in the base gaming module and is operable to be coupled to additional gaming modules; 2) determining a security configuration of the modularized gaming machine where the security configuration includes a list of security devices from which to anticipate information, 3) configuring error conditions of the gaming machine according to the determined security configuration of the gaming machine and; 4) while the gaming machine is available for game play, determining whether error conditions have occurred using the anticipated information from security devices in the determined security configuration.

The method may further comprise one or more of 1) detecting which gaming modules are coupled to the base gaming module and in response to detecting which gaming modules are coupled to the base gaming module determining the security configuration for the modularized gaming machine, 2) determining whether each of the security devices in the determined security configuration is communicatively coupled to the security system where a first number of security devices in a first security configuration for the modularized gaming machine comprising only the base gaming module is less than a second number of security devices in a second security configuration for the modularized gaming machine comprising the base gaming module coupled to a second gaming module, 3) determining an error condition has occurred and generating a tilt condition in the modularized gaming machine and 4) in response to the tilt condition, disabling game play on the modularized gaming machine.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing a combination inner video display and rotatable object. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

Figure 6:
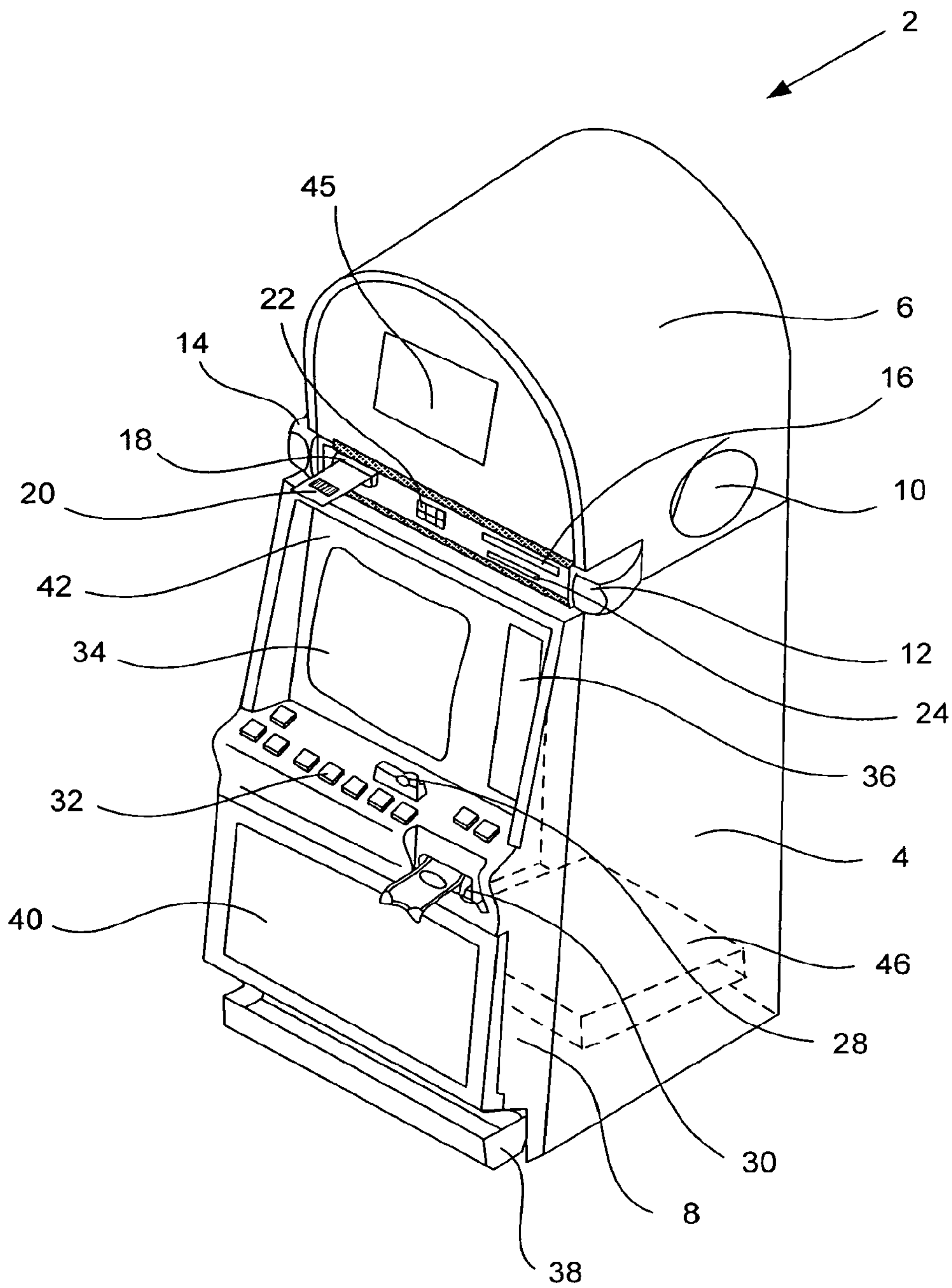
FIG. 6 illustrates a perspective view of one embodiment of a gaming machine.
Figure 7:
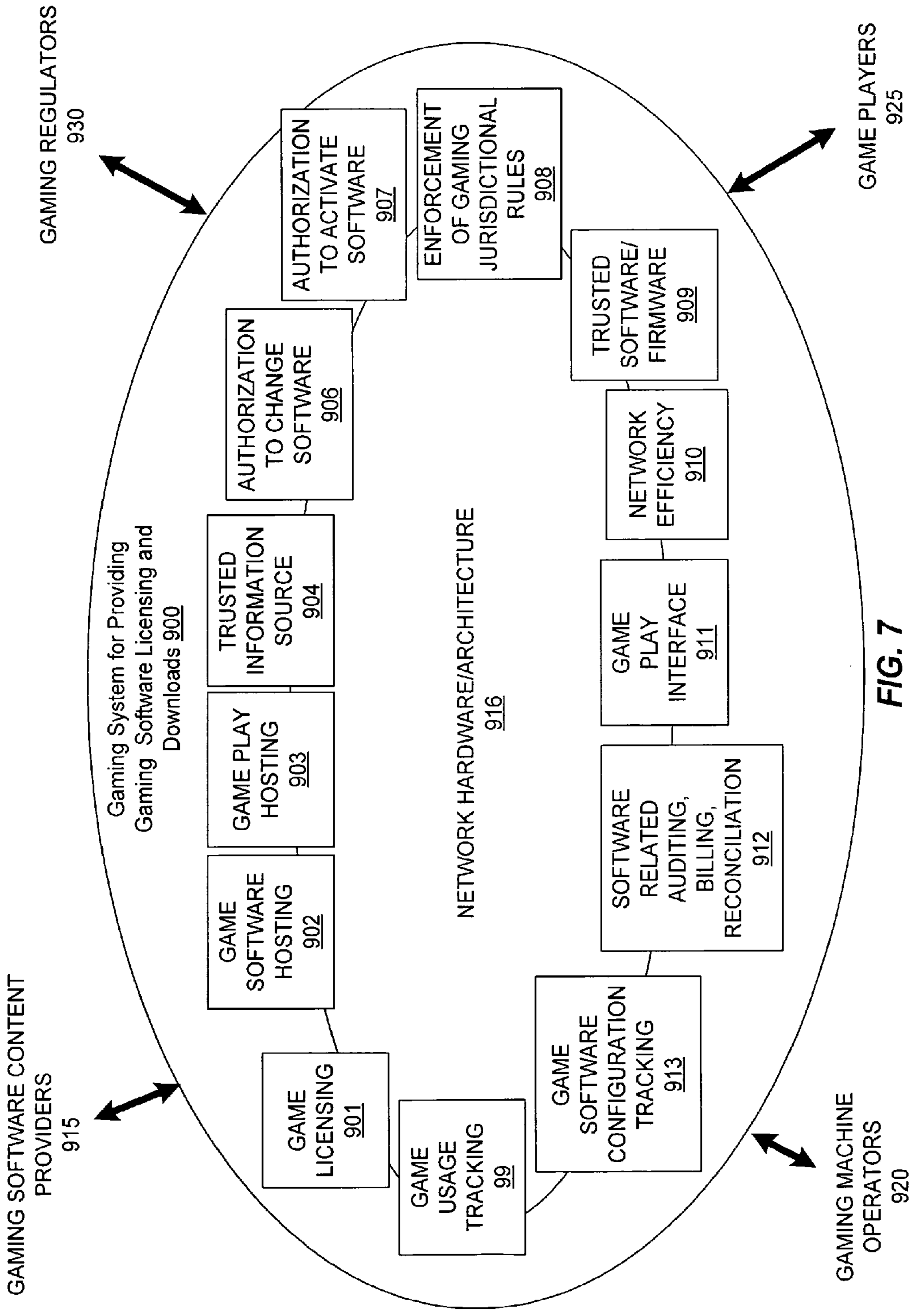
FIG. 7 illustrates a block diagram of a gaming system of the present invention.

In FIGS. 1A-2C, embodiments of a modular gaming system and associated modules are described for the purposes of illustration. In FIGS. 3-5 embodiments of a security system for a modular gaming system are described for the purposes of illustration. In FIGS. 6 and 7, additional embodiments of methods and apparatuses that may be utilized with modular gaming systems are described.

Figure 1A:
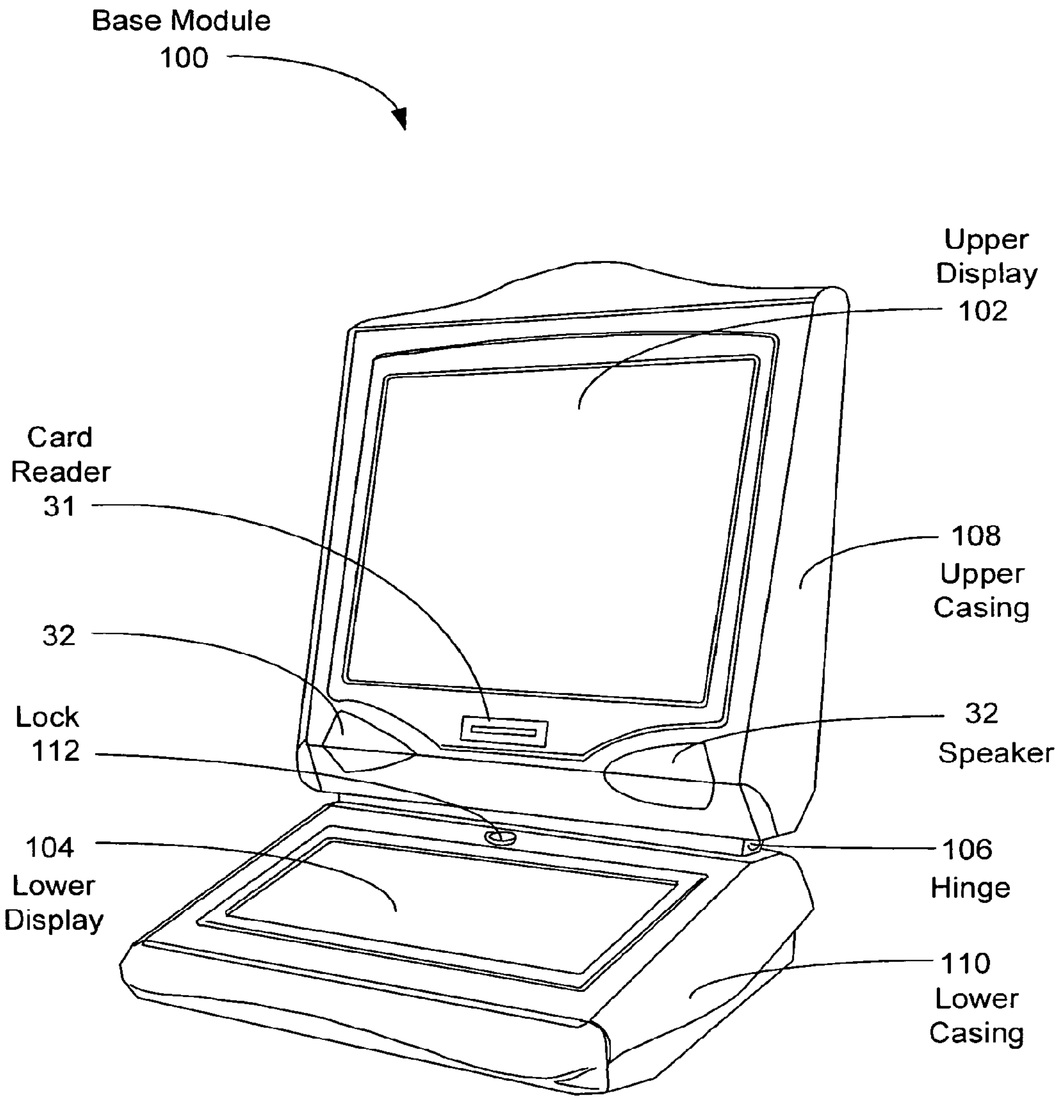
FIG. 1A illustrates in perspective view one embodiment of a base gaming module for a modularized gaming machine.

FIG. 1A illustrates in perspective view one embodiment of a base gaming module 100 that may be utilized as a component of a modularized gaming machine for one embodiment of the present invention. The base gaming module 100 may comprise a display for presenting a game played on the base gaming module, a first input mechanism for providing inputs associated with the game played on the base game module or other activities associated with the base game module and a second input mechanism for allowing a player to access funds utilized to play game.

In particular embodiment, the base gaming module 100 may comprise an upper video display 102 coupled to an upper casing 108 a lower video display 104 coupled to a lower casing, speakers 32, a card reader and a locking mechanism for an access port that allows access to the interior of the lower casing 110. The present invention is not limited to one access port. The upper casing 108 may also include an access port and a locking mechanism (not shown) or the lower casing 110 may include additional access ports. The master gaming controller (not shown) that controls a game played on the base gaming module 100 may comprise electronic circuitry located in the upper casing 108, located in the lower casing 110 or distributed between the upper casing 108 and the lower casing 110.

The upper video display 102 and/or the lower video display 104 may be coupled to touch screen sensors. When the upper video display 102 or the lower video display 104 includes a touch screen sensor, the touch-enabled display may be utilized to generate to touch activated display areas that are used to provide input to the base module, such as but not limited to inputs related to the play of a wager-based game. In other embodiments, the upper casing 108 or the lower casing 110 may include mechanical input buttons or switches used to provide input to the base gaming module 100. In a particular embodiment, a number of mechanical input buttons may be utilized in lieu of the lower display.

The functions of the upper video display 102 and/or the lower video display 104 may vary with time. For example, at one time, the lower video display 104 may be utilized to provide inputs for a card game or a slot game presented on the upper video display 102. At another time, the upper video display 102 may be utilized to display video content, such as a movie, television programming or web-accessible content, while the lower display 104 may be used to display and receive inputs for a game, such as a slot game or card game. At another time, the upper video display 102 may be used to display and receive inputs for a first game while the lower video display 104 may be used to display and receive inputs for a second game. In yet another time, a primary game may be displayed on the upper video display 102 while an associated secondary game is displayed on the lower video display 104. The speakers 32 may be used to output sounds associated with content displayed on one or both of the upper video display 102 or the lower video display 104.

In a particular embodiment, the upper casing and lower casing may be coupled via a hinge mechanism 106 that allows the angle of the upper casing 108 relative to the lower casing 110 to be adjusted. In other embodiments, the upper casing 108 may be coupled to the lower casing 110 in manners that allow additional degrees of freedom of movement. For example, via a ball type couple, the upper display 102 may be operable to rotate through two angles relative to the lower casing 110. In another example, the upper casing 108 may include a mechanism that allows a distance between the upper casing 108 and the lower casing 110 to be adjusted. Using the mechanism, when the lower casing 110 is mounted to a horizontal surface, a distance between a point on the upper display and the horizontal surface may be adjusted.

The base module 100 may include hardware and/or software that enable a value amount to be committed during the play of a game on the base module. The value amount may be one or more credits used to wager on an outcome to a game where the credits are convertible to cash. In one embodiment, a card reader 31 may be used to interrogate a card, such as a smart card or a magnetic striped card that stores a value amount that may be utilized for game play. The card reader 31 may be operable to transfer a value amount stored on the base module 100 to a card inserted in the card reader, such as writing an amount to a magnetic striped card or a smart card.

In another embodiment, the card reader may store account information and/or other information, such as a player's name that the play may access to obtain a value amount for game play on the base module. For instance, after a card storing account information is inserted in the card reader 31, the player may be prompted to enter a pin or a password that allows the player to access an account containing funds that may be transferred to the base gaming module for game play. After a game play session is over, the base module 100 may be operable to allow the player to transfer any remaining funds to a remotely maintained account. The base module 100 may communicate with a remote device maintaining the account using a wired communications, wireless communications or combinations thereof.

The value handling functions described above may be performed using other combinations of devices, which may or may not include the card reader 31. For instance, using a touch screen display, such as 102 or 104 when enabled, a player may be able to input account information that allows a value amount to be transferred between a remotely maintained account to the base module 100. In another example, the base module 100 may include a wireless interface (not shown) that allows the base module to communicate with a wireless device, such as an RFID device, a cell phone or a wireless transceiver. The wireless device may store a value amount, account information, player identification information or combinations thereof.

In yet another example, the base module 100 may include an interface, such as a USB port (not shown), that allows information to be transferred between the base module 100 and a portable memory device. The portable memory device may comprise a flash drive or portable hard drive. In a further example, the interface may allow a memory card, such as a flash memory card to be interrogated by the base module 100. Additional details of value handling mechanisms and methods that may be utilized with the base module are described with respect to FIG. 6.

The base module 100 may include one or more mounting interfaces that allows one or more of the upper casing 110 or the lower casing to be coupled to a surface. For example, in a particular embodiment, the upper casing 108 may be mounted to a first surface, such as a wall, while the lower casing 110 is allowed to some degree of movement relative to the upper casing 108 (The position of the lower casing 110 relative to the upper casing may be also fixed). In another embodiment, the lower casing 110 may be coupled to a surface, such as a bar-top or a surface on another gaming module (see FIG. 1B), while the upper casing 108 is allowed movement (or may be fixed) relative to the lower casing 110. In yet another embodiment, the upper casing 108 and the lower casing 110 may both be coupled surfaces. For instance, the upper casing 108 may be coupled to a vertical surface while the lower casing 110 may be secured to a horizontal or angled surface.

Figure 1B:
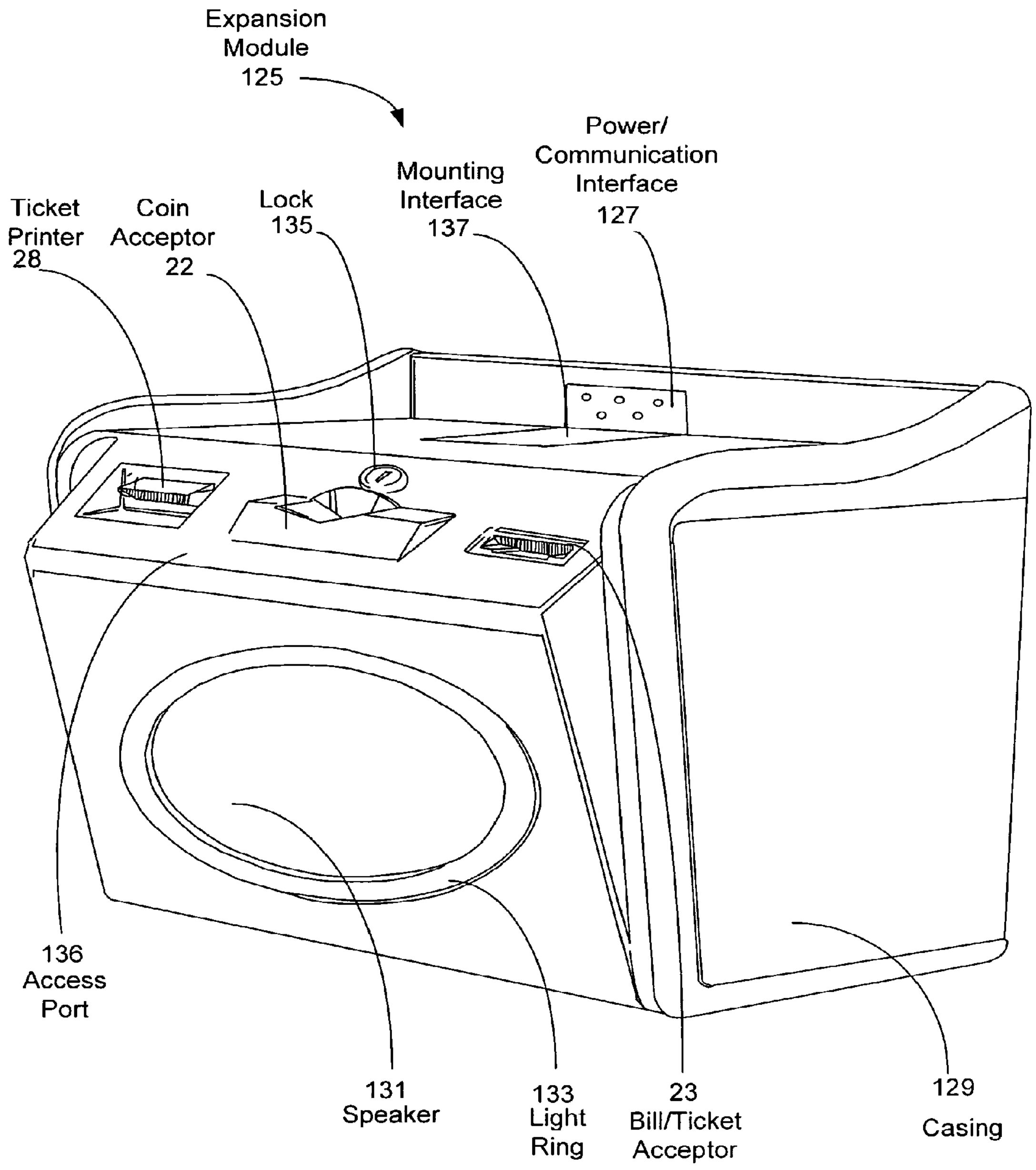
FIG. 1B illustrates in perspective view one embodiment of an expansion gaming module for a modularized gaming machine.

FIG. 1B illustrates, in perspective view, one embodiment of an expansion gaming module 125 that may be utilized as a component of a modularized gaming machine. The expansion module 125 includes a mounting interface 137 on an upper surface of case 129 that allows the expansion module 125 to be coupled to another gaming module, such as the base gaming module 100 described with respect to FIG. 1A. An additional mounting interface or an area for hardware associated with an additional mounting interface may be provided on a lower surface and/or sides of the casing 129 (not shown) as needed.

The expansion module 125 comprises a ticket printer 28, a coin acceptor 22, bill/ticket acceptor and validator, a speaker 131 and a surrounding light ring 133. Many other combinations of peripheral devices are possible and the present invention is not limited to the combination of devices and location of devices illustrated in FIG. 1B. For example, the coin acceptor 22 may be removed from the expansion module 125 in one embodiment. In other embodiments, the location of the peripheral devices, such as the ticket printer 28, bill acceptor 23 and speaker 131 may be varied. Further, the size and shape of the casing 129 may be varied.

The casing 129 of the expansion module 125 includes an access port 136 with a lock 135. In various embodiments, the access port 136 may be coupled to a hinge near the bottom of the casing 129, to the left of speaker 131 or to the right of speaker 131, such that the access port 136 may opened to allow access to the interior of the expansion module. The present invention is not limited to this access port configuration, which is provided for illustrated purposes only, other access port configurations, such as an access port on any of the surfaces of the expansion module 125, and access ports configurations including one or more access ports may also be utilized.

The mounting interface 137 may include an integrated power/communication interface 127. The power/communication interface 127 may also be a component separate from the mounting interface 137. The power/communication interface 127 may allow power and/or communications signals to be transferred between the expansion module and a gaming module mounted to the expansion module 125. For example, when the base gaming module 125 is coupled to the expansion module 125 as shown in FIG. 2A, then when the base gaming module may communicate with the peripheral devices located on the expansion module, such as the speaker 131, light ring 133, bill/acceptor 23, ticket print 28 and coin acceptor 22.

The power/communication interface 127 may also allow information from sensors or other detection devices located on expansion module 125 to be communicated to a security system located on another gaming module, such as base gaming module 100. For example, expansion module 125 may include sensors or other detection devices for determining but not limited to 1) when lock 125 has been actuated, 2) when the position of the access port 136 is changed, such as the access port is opened, 3) when one of the peripheral devices, such as the ticket printer 28, coin acceptor 22 or bill/ticket acceptor 23 is disconnected from an acceptor within the casing 129, 4) when a lock box containing tickets is removed or accessed, 5) when a lock box containing bills or tickets accepted by the bill/ticket acceptor 23 is accessed or removed and 6) when wiring to one or more of the peripheral devices in the expansion module has been tampered with or altered.

Figure 2A:
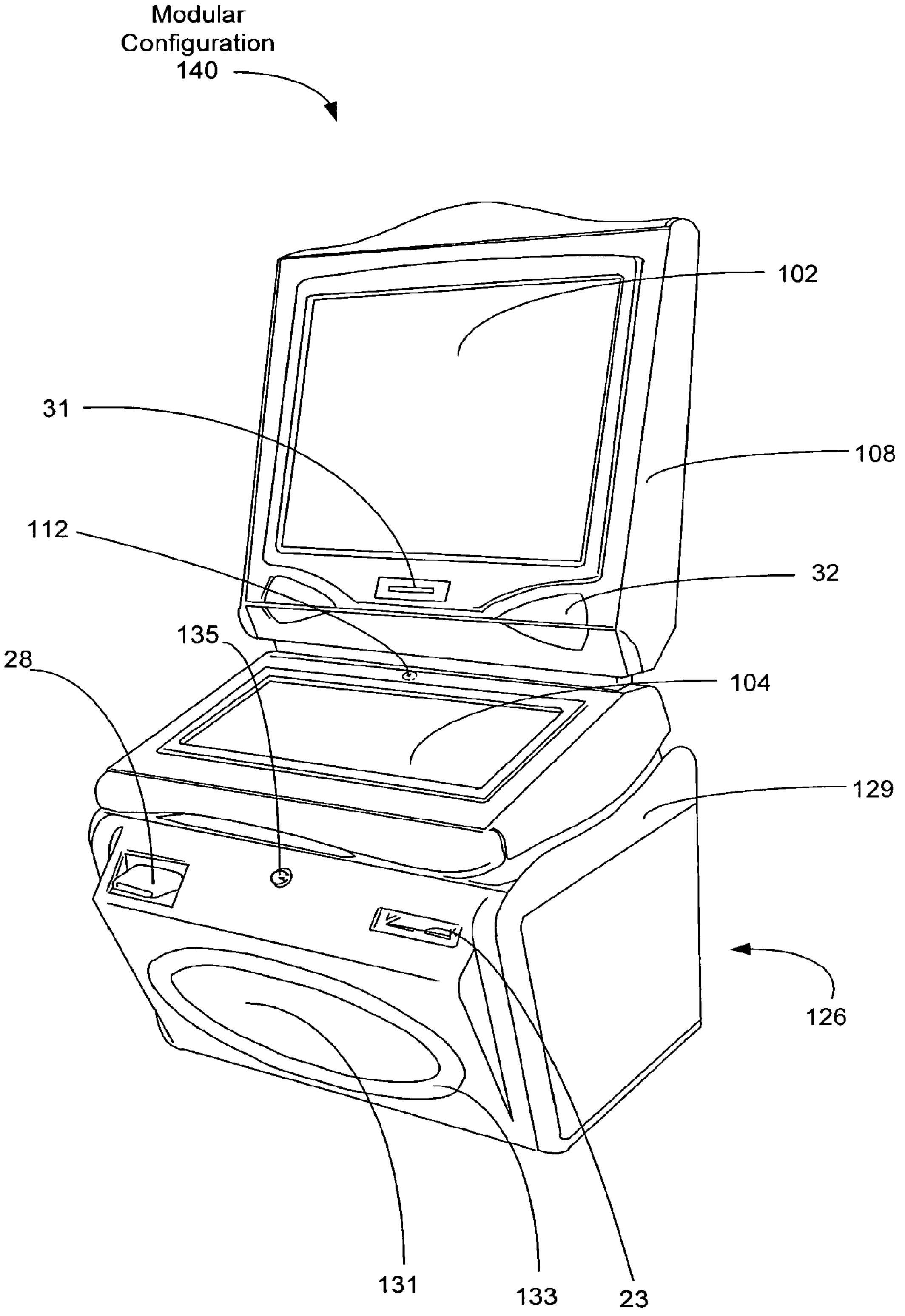
FIG. 2A illustrates in perspective view the base gaming module of FIG. 1A coupled to the expansion gaming module of FIG. 1B in one embodiment of a modularized gaming machine.
Figure 2B:
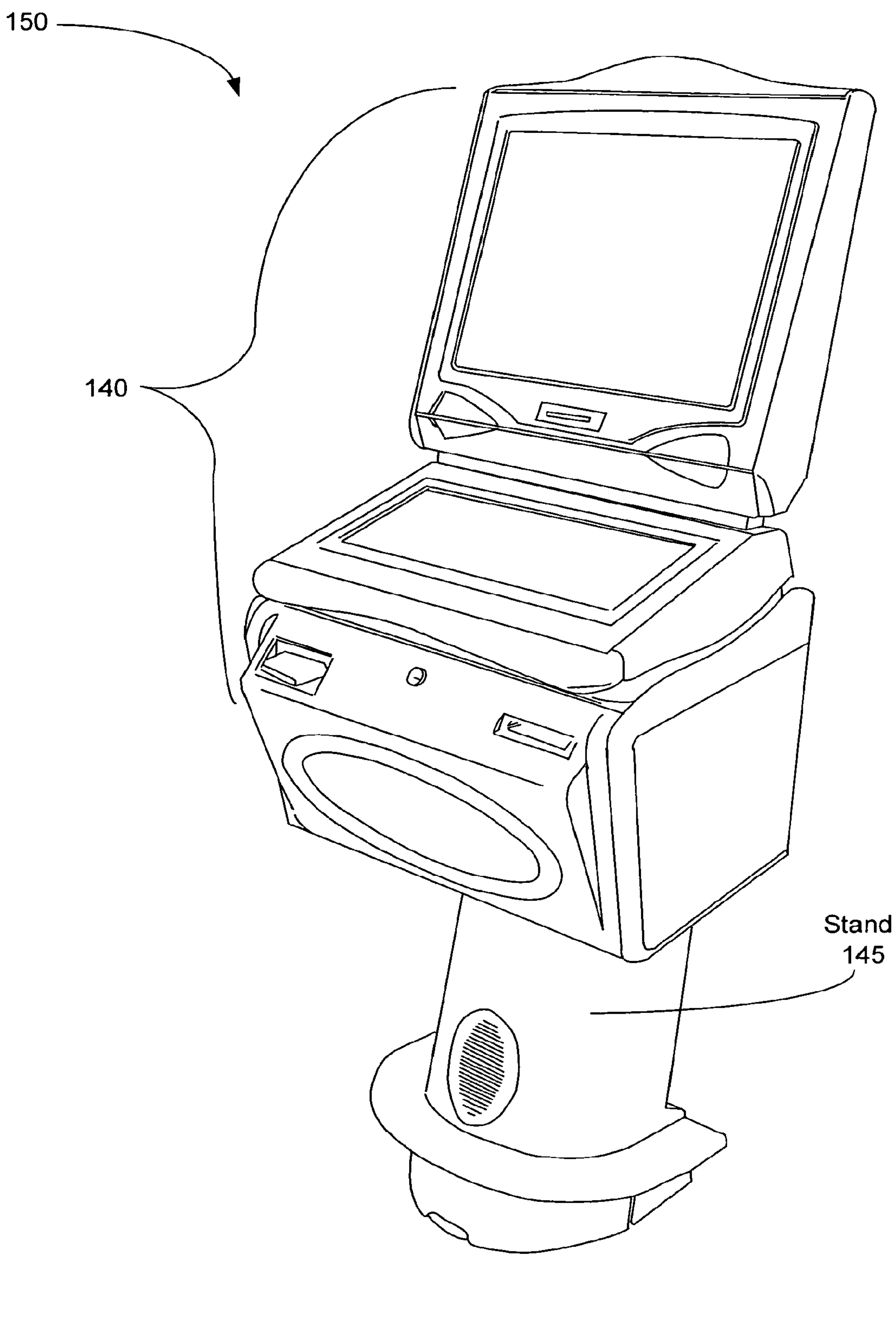
FIG. 2B illustrates in perspective view the base gaming module of FIG. 1A coupled to the expansion module of FIG. 1B coupled to an additional expansion module in another embodiment of a modularized gaming machine.
Figure 2C:
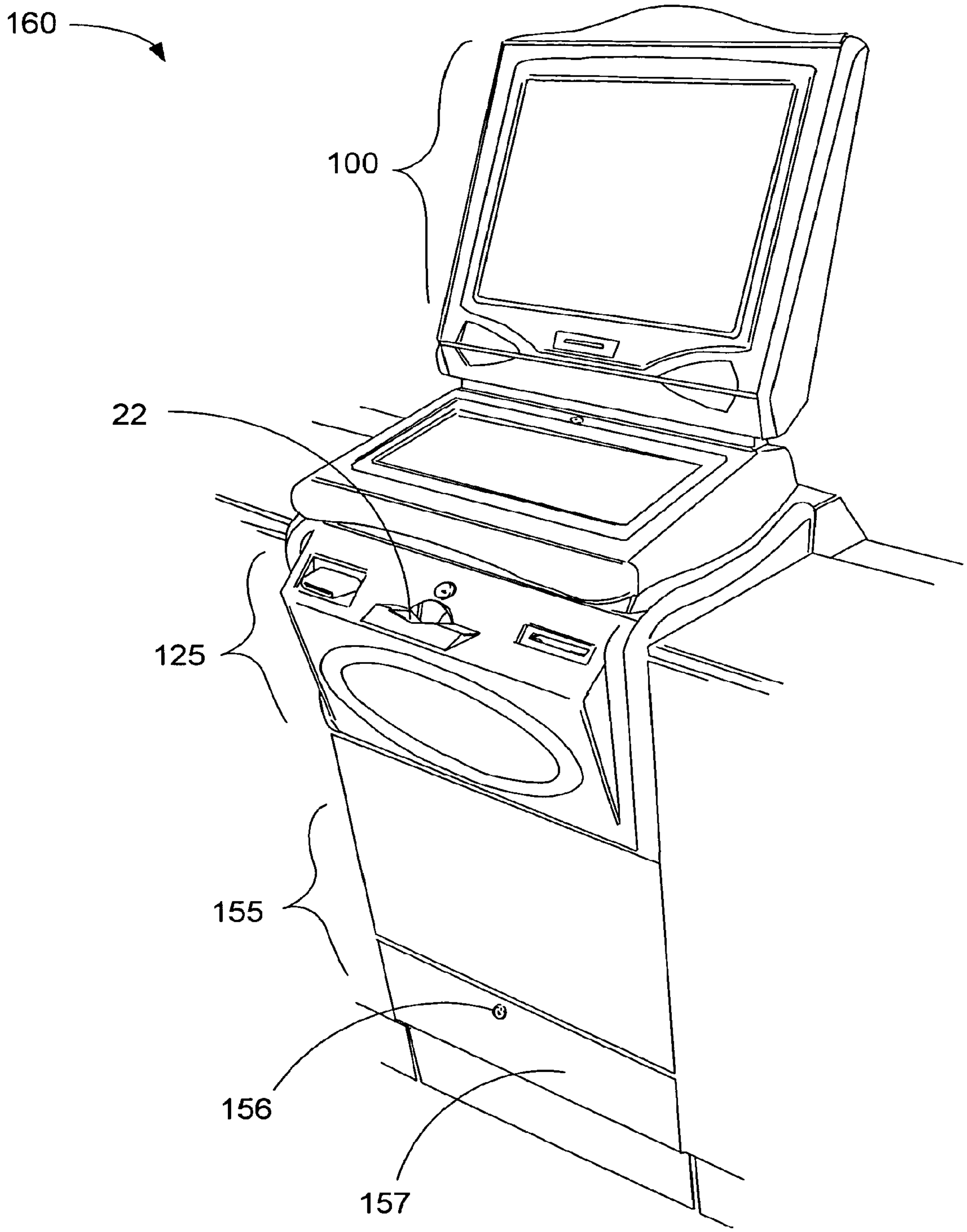
FIG. 2C in perspective view the base gaming module of FIG. 1A coupled to the expansion module of FIG. 1B coupled to an additional expansion module in a bank of gaming machines.
Figure 3:
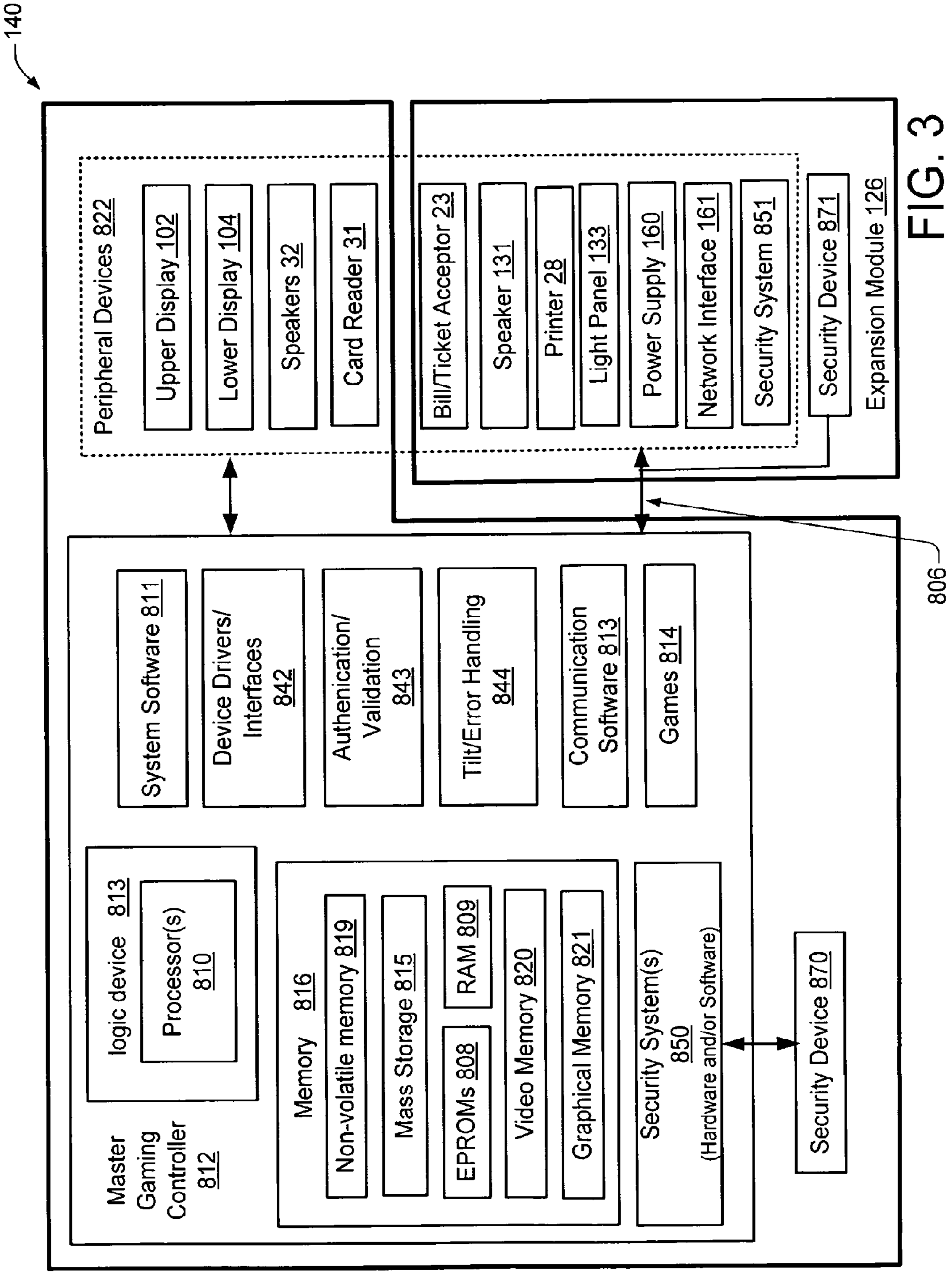
FIG. 3 illustrates a block diagram of modularized gaming machine for one embodiment of the present invention.

FIGS. 2A-2C are embodiments of modular gaming machines. These embodiments are provided for illustrative purposes only. FIG. 2A illustrates, in perspective view, the base gaming module 100 of FIG. 1A coupled to an expansion gaming module 126 for one embodiment to provide the modular configuration 140. The expansion gaming module 126 is similar to the expansion gaming module 125 of FIG. 1B except it does not include a coin acceptor 22. The modular configuration 140 may be mounted/coupled to another module or mounted/coupled to a surface, such as bar-top or a wall.

FIG. 2B illustrates, in perspective view, the base gaming module 100 of FIG. 1A coupled to the expansion module 126 of FIG. 2B coupled to an additional expansion module in another embodiment. The modular configuration 140 is coupled to a stand 145 to provide a free standing modularized gaming machine 150. The stand 145 may be coupled to the floor in some manner and may comprise mounting hardware that allows the lower surface of module 126 to be coupled to the stand 145.

FIG. 2C illustrates, in perspective view, the base gaming module 100 of FIG. 1A coupled to the expansion module 125 of FIG. 1B coupled to an additional expansion module 155 where the resulting modularized gaming machine 155 is incorporated into a bank of gaming machines for one embodiment of the present invention. In one embodiment, the expansion module 155 may include a drop box for coins collected from the coin acceptor 22. The coins/tokens in the drop box may be periodically collected via actuating door 156 with lock 157 to access the drop box.

The base gaming module 100 may monitor access to the interior of expansion module 155. For example, the expansion module 155 may comprise sensors or detection devices that allow the base gaming module 100 to determine when lock 157 is actuated, when door 156 is opened, when a coin tray is removed, when coins from a coin tray are removed or combinations thereof. The expansion module 155 may include a power/communication interface that couples with the expansion module 125, such that information from any sensor or detection devices within the expansion module may be communicated to the base gaming module 100.

FIG. 3 is a simplified block diagram of a modularized gaming machine 140 in accordance with a specific embodiment of the present invention. As illustrated in the embodiment of FIG. 3, the modularized gaming machine 140 comprises a base gaming module 100 and an expansion module 126. A perspective view of the modularized gaming machine is shown in 2B.

A master gaming controller (MGC) 812, located in the base gaming module 100. The MGC 812 may comprise a plurality of hardware and software components, such as processor 810, memory components 816, graphic cards (not shown), sound cards (not shown), wiring connections (not shown), a mother board (not shown), expansion cards (not shown), system logic 811, device driver/interface logic 842, authentication/validation logic 843, tilt and error handling logic 844, communication logic 813, game logic 814 and a security system 850 which may comprise hardware and/or software. In general, logic may be embodied hardware, software or combinations thereof. The MGC 812 is operable to communicate with a number of peripheral devices 822. The peripheral devices 822, for this example, comprise an upper display 102, a lower display 104, speakers 32 and a card reader 31, which are each located in the base gaming module 100. The MGC 812 is also operable to communicate with a bill/ticket acceptor 23, a speaker 131, a printer 28 and a light panel 133, which are each located in the expansion module 126.

An interface 806 allows the MGC 812 to communicate with the expansion module 126. The interface 806 may be enabled when a first interface on the base gaming module 100 is coupled to a second interface on the expansion module 126. The MGC 812 may be operable to detect when the interface 806 is engaged and another gaming module is coupled to the base gaming module.

The interface 806 may comprise one or more communication connections and/or power connections. Multiple interfaces are possible and the present invention is not limited to a single interface 806. In one embodiment, the interface 806 may carry power from a power supply 160 located in the expansion module 126 to the base gaming module 100. The interface 806 may also allow the MGC 812 to communicate with remote gaming devices via a network interface 161 located in the expansion module 126.

The MGC 812 may include hardware, software or combinations thereof for monitoring a security system 850 and determining tilt/error conditions. The security system 850 may comprise circuitry that allows the MGC 812 to receive information from various sensors or security devices coupled to the modular gaming machine 140. The tilt/error handling 844 may include logic that specifies how the MGC 812 is to respond in response to information received from the various sensors or security devices.

Next, some examples of features of the security system 850 and the tilt and error handling 844 are described for a modular gaming machine. These features include a security system 850 that in some embodiments may be dynamically configurable depending on a configuration of the modular components that comprise the modularized gaming machine. After the security system 850 and the tilt and error handling 844 are described, additional details of the MGC 812 are described with respect to FIG. 3. Then, additional details related to the security system 850 and the tilt and error handling 844 are further described with respect to FIGS. 4A, 4B and 5.

The security system 850 may be configured to anticipate information, such as a signal, from particular sensors or other detection devices coupled to the base gaming module and any expansion modules coupled to the base gaming module, such as security device 870 and security device 871. For example, security device 870 or security device 871 may comprise a sensor coupled to an access port and/or a lock, which may be part of a circuit that generates a signal received by the security monitor system when the access port is closed or the lock is in a locked position. When the access port is opened or the lock is in an open position the signal may be interrupted and the security system 850 may be configured to detect the interruption of the signal and provide information that is utilized by the tilt/error handling 844. Conversely, security device 870 and security device 871 may be a sensor coupled to an access port and/or the lock, which may be part of a circuit that doesn't generates a signal received by the security monitor system when the access port is closed or the lock is in a locked position. When the access port is opened or the lock is in an open position a signal may be generated and the security system may be configured to detect the signal and provide information that is utilized by the tilt and error handling 844.

In response to receiving the information from the security system 850, the tilt and error handling 844 may be configured to generate one or more responses or not respond. The response that is generated may vary according to the event or combinations of events, such as a door is opened or a door is opened and an authorization code is not entered into the gaming device. The response may also vary according to the jurisdiction in which the modular gaming machine is located. As examples, in response to receiving an event or a combination of events, the tilt and error handling 844 or other logic on the modularized gaming machine 140 may be operable to ignore the event, store a record of the event, place the modularized gaming machine in a tilt state, send a message to a remote device, activate a device on the base gaming module, such as make a light flash or combinations thereof.

Some examples of security devices and that may be utilized in the base gaming module or expansion modules include but are not limited to optical sensors, magnetic sensors, mechanical sensors, accelerometers, position sensors, GPS location devices, cameras, light sensors. The security devices may be configured with associated circuitry to detect various events, such as not limited to a) determining when the base gaming module or other expansion module position is changed, such as moving or tilting the module, b) determining when an access port is actuated (e.g., fully or partially opening or closing the access port), c) determining when a lock is actuated, d) determining when a component is removed from an acceptor, e) when a circuit is modified, such as accessing signal path on a wire, f) detecting when one or more peripheral devices coupled to the gaming machine are accessed, g) detecting when a retaining latch is actuated or h) detecting interrupts in a power supply utilized by the security system or one or more the security devices. Some examples of access ports that may be provided in a base gaming module or an expansion module include but are not limited to a cover to the base gaming module, an external access port to the interior of an expansion module, a bill stacker door, a CPU security door, a belly door, a drop door or a coupon dispenser door.

In one embodiment, at power-up or prior to allowing game play, the MGC 812 may attempt to determine its security configuration. For example, the security configuration for the base gaming module may include types of devices, security devices and associated error conditions. The security configuration for the base gaming module may be stored in a memory device located on the base gaming module, such as a read-only or read-write memory device. In one embodiment, when the base gaming module is powered-up, the security configuration for the base gaming module may be automatically loaded from a storage location in a memory device.

The base gaming module may include security detection devices that operate using an internal power source within the base gaming module, such as a battery. These security detection devices may be coupled to the security system 850 and may be operable to detect some security events, such as an actuation of access port that occurred when base gaming module is not coupled to an external power source. Thus, when the MGC 812 is powered-up, the MGC 812 may check for any security events that may have occurred when the base gaming module is not connected to an external power source (e.g., during transport). The tilt and error handling 844 may include logic for responses to the security events that may have occurred while base gaming module is without external power. This check may occur before or after the security configuration for the base gaming module is loaded.

In one embodiment, after the security configuration for the base gaming module is loaded, the MGC 812 may attempt to determine whether any expansion modules are connected to the base gaming module. For instance, in one embodiment, via a display on the base gaming module, an operator may be able to specify a code or other information related to the configuration of one or more expansion modules coupled to the base gaming module. In another embodiment, the base gaming module may be to detect that one or more expansion modules are coupled to the base gaming module.

The base gaming module may be able to determine that an expansion module is connected through hardware, software or combinations thereof. In one embodiment, when the base gaming module is coupled to one or more expansion modules, one or more signal paths between the base gaming module and the one or more expansion modules may be activated. The base gaming module may monitor the one or more signal paths to determine whether one or more expansion modules are connected to the base gaming module. Further, a plug-and-play type methodology may be employed that allows the base gaming module to determine when expansion modules are coupled to the base gaming module. The plug-and-play methodology may specify a protocol for the base gaming module to follow in regards to monitoring the signal paths.

During power-up, the base gaming module may attempt to contact expansion modules or peripheral devices using a specified signal path that may be coupled to the base gaming module to determine if any expansion modules and/or peripheral devices are connected. Expansion modules or peripheral devices may also try to contact the base gaming module when they are coupled to the base gaming module. A protocol, such as a USB protocol, may specify the format of the communication and the information that may be exchanged. When the base gaming module doesn't detect any expansion modules or peripheral devices (e.g., it does not receive any communications for these devices), then it may operate in a stand-alone security configuration. When the base gaming module detects an expansion module and/or one or more associated peripheral devices, an authentication routine may be carried out that allows the base gaming module to authenticate that it is communicating with an authorized. An example of authentication routine may include exchanging information using public-private encryption key pairs.

In another embodiment, expansion module may include one or more logic devices that are operable to communicate security information about the expansion module, such as but not limited to information regarding security detection devices, error conditions, peripheral device coupled to the expansion module. The base gaming module may be operable to interrogate a logic device coupled to the expansion module, such as a memory device, microcontroller or more sophisticated devices, such as process to determine the functions and/or features of the expansion module including its security configuration.

In addition, the base gaming module may be operable to interrogate a peripheral device coupled to an expansion module to determine functions and/or features of the peripheral device including error handling events that may be associated with the peripheral device. Using the information learned from the one or more expansion modules and in conjunction with any security information stored locally on the base gaming module related to the one or more expansion modules. The base gaming module may be operable to configure its security system 850 and/or its tilt and error handling to account for the security configuration of the one or more expansion modules and any associated security events that may be generated while the one or more expansion modules are operating.

In another embodiment, the expansion module may be operable to provide identification information, such as but not limited to a code, serial number, hardware identification number or combinations thereof. Using the code or other information, the base gaming module may be operable to determine the devices and security devices located on the one or more expansion modules using security information stored locally on the base gaming module and adjust its security configuration including its tilt and error handling to account for the security configuration of the one or more expansion modules and any associated security events that may be generated while the one or more expansion modules are operating. When base gaming module doesn't recognize the expansion module, for example, the identification information doesn't correspond to information stored on the base gaming module, then the base gaming module may generate an error condition indicating it may be connected to a non-secure device and may ignore communications from the expansion module and its associated devices.

Like the base gaming module, the expansion module may include security detection devices, which may be part of a security system, such as 851, that are configured to operate with an internal power source, such as a battery. The internal power source may provide power to the security system 851. The security system may allow security events, such as opening an access port on the expansion module or the expansion module being taken to an authorized location (GPS tracking may be used for this purpose), to be detected while the expansion module is not connected to an external power source. Thus, after the base gaming module establishes communications with an expansion module that includes an internal security system for monitoring power-off event, the base gaming module may attempt to determine whether the expansion module has recorded any security events prior to power-up and when a security event is detected generate a response, such as entering a tilt state when appropriate.

Figure 4A:
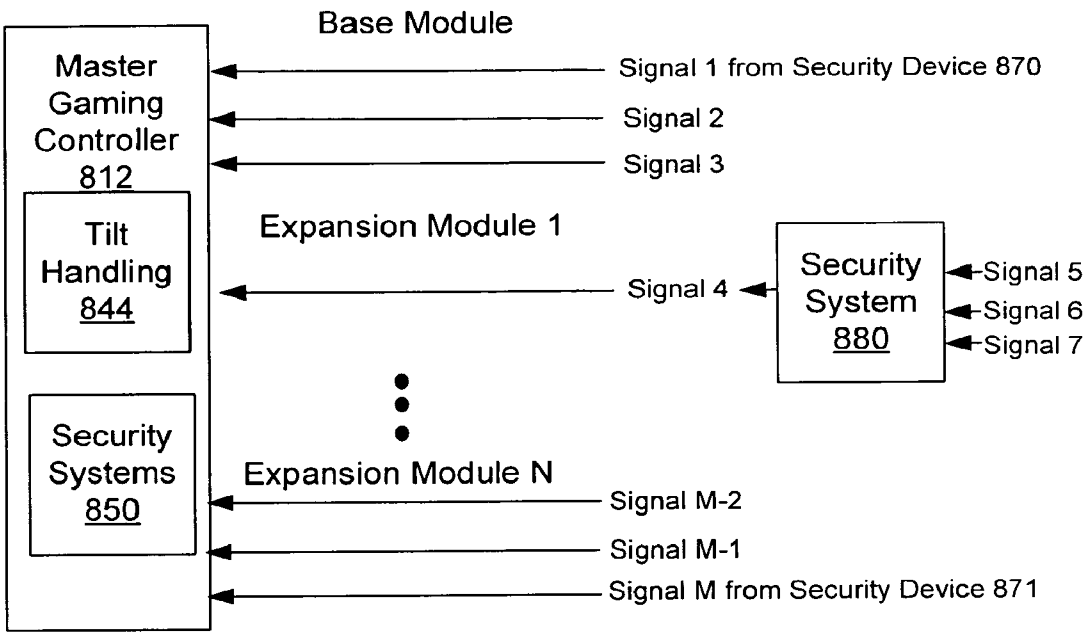
FIGS. 4A and 4B illustrates a block diagram of a security system for embodiments of the modularized gaming machines of the present invention.
Figure 4B:
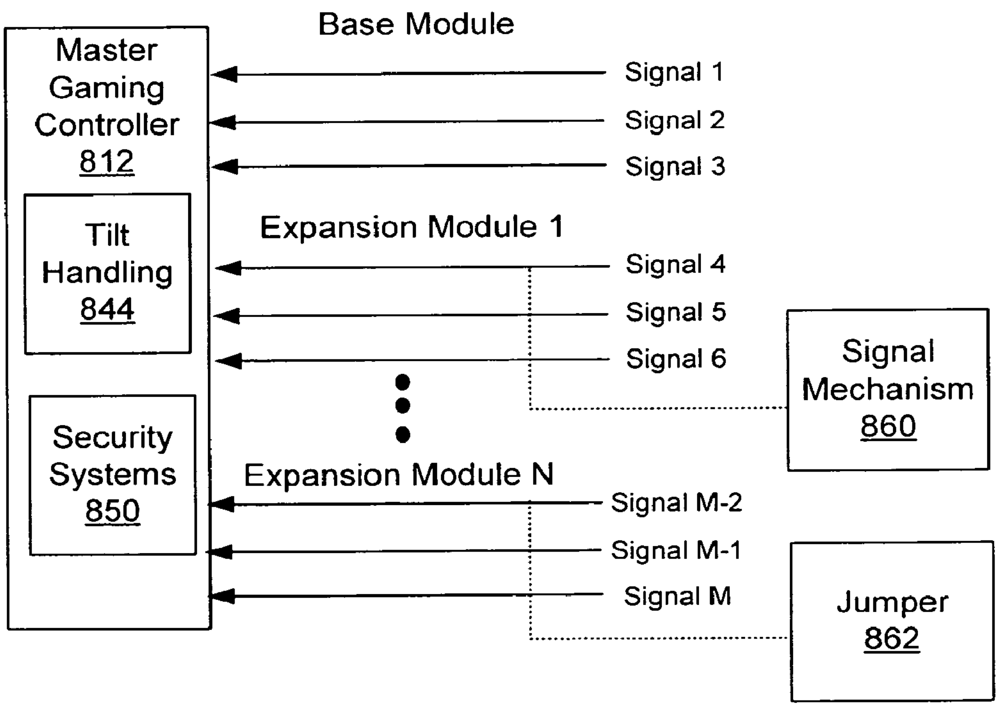
Figure 5:
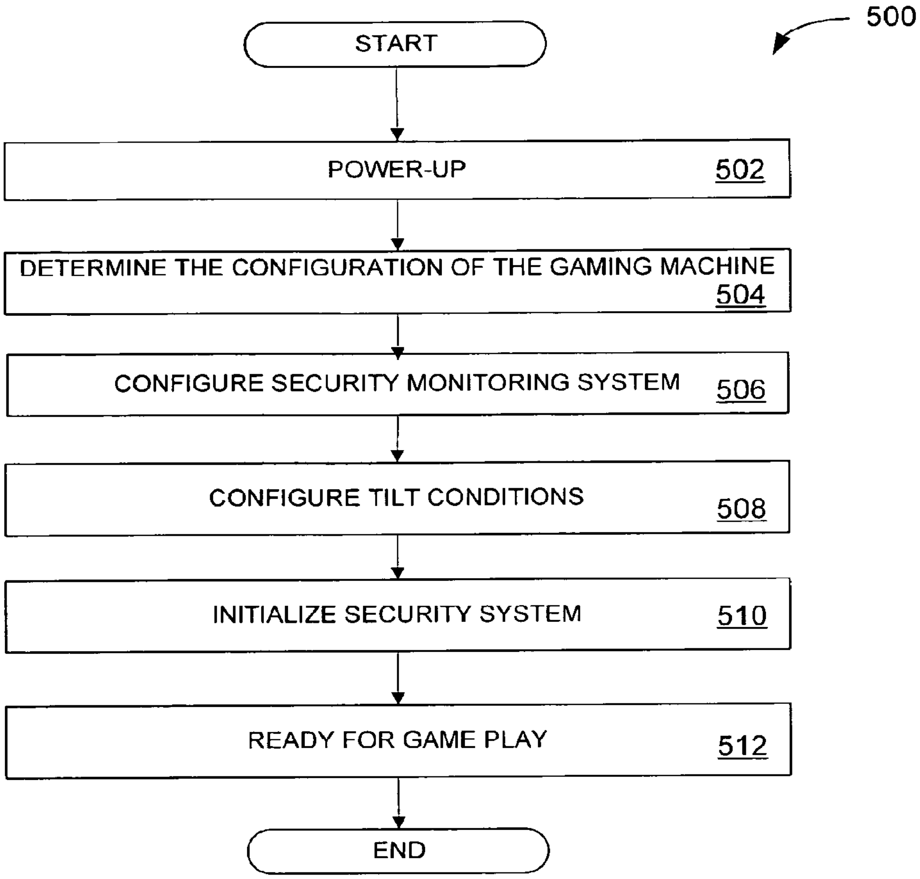
FIG. 5 illustrates a flow diagram for a method of initializing game play on a modularized gaming machine of the present invention.

In another embodiment of the present invention, which is described in more detail of with respect to FIGS. 4A, 4B and 5, the base gaming module may be configured with a fixed security configuration and tilt and error handling that accounts for the security configurations of one or more expansion modules or combinations of expansion modules that may be coupled to the base gaming module. The base gaming module may be configured to operate with the fixed security configuration that attempts to monitor security devices or receive information regarding security events from one or more expansion modules when the base gaming module is operating in a stand-alone or when the base gaming module is coupled to the one or more expansion modules.

Thus, for various configurations of modular gaming machine including a base gaming module operating alone or operating in combination with one or more expansion module, the base gaming module may look for signals from security devices, such as 871, or expect to receive information regarding security from one or more devices, such as 23 or 28, that may in a particular configuration of the modular gaming machine may not be coupled to the base gaming module. To prevent an error condition from be triggered when the security system 850 is looking for information from a security device that is not presently connected to the base gaming module, a signal mechanism may be coupled to the base gaming module that generates a non-error condition along one or more signal paths that the security system 850 is monitors.

The non-error condition, which may vary depending on the type of security device and associated circuitry that is employed, that is generated may be the same non-error condition that is generated when a security device is coupled to the base gaming module and operating properly. Therefore, even though one or more security devices are not connected, the base gaming module may operate as the base gaming module may operate as though the security devices were connected including monitoring signal paths associated with the security devices for error conditions. However, as long as the signal mechanism is functioning properly, the base gaming module may not generate an error response that is associated with a non-connected device because it may always receive a non-error condition from the signal mechanism.

One example of a signal mechanism may be a mechanical jumper that provides a signal path with the non-error condition. Another example of a signal mechanism may be a logic device that may or may not be configurable. A configurable logic device coupled to the base gaming module may be employed to generate non-error conditions that are compatible with various configurations of a modular gaming machine. When during the initialization procedure, an initial diagnostic procedure is employed to determine whether all of the security devices are operating properly, such as sending out or requesting test signal from one or more security devices and one or more security devices are not coupled to the security system, then a logic device may be configured to generate needed responses to a diagnostic procedure used during an initialization process. The two embodiments described above of a dynamically configurable security system and fixed security system where a signal mechanism is employed to generate non-error conditions for devices not coupled to the base gaming module may also be combined to provide a first portion of the security system that is dynamically configurable and a second portion that is not dynamically configurable.

Next, further details of the MGC 812 are described. In a particular embodiment, the MGC 812 comprises a processor 810 included in a logic device 813. In one embodiment, the MGC 812 may be enclosed in a logic device housing, which may be a separate compartment of the base gaming module. In another embodiment, portions of the MGC 812 may be sealed or covered to limit access to the MGC 812. The processor 810 may include any conventional processor or logic device configured to execute software allowing various configuration and reconfiguration tasks such as, for example: a) communicating with a remote source via communication interface 806, such as a server that stores authentication information or games; b) converting signals received at an interface to a format corresponding to that used by software or memory in the gaming machine; c) accessing memory to configure or reconfigure game parameters in the memory according to indicia read from the device; d) communicating with interfaces 806 and various peripheral devices 822; e) providing operating instructions for peripheral devices 822 such as, for example, card reader 31 and bill acceptor 23; f) providing operating instructions for various I/O devices such as, for example, display 102, display 104, printer 28 and a light panel 133; etc.

As examples, the processor 810 may display a video presentation of a game, such as a game of chance, on displays 102 and 104 and receive inputs of game selections made using displays 102 and 104 in combination with touch screens coupled to each display and the video memory 820/and or graphical memory 821 (These memories may also be coupled to separate processors, such as a video or graphics processor). As another example, the logic device 813 may send commands, instructions and or data to the light panel 133 to display a particular light pattern and to the speakers 32 and 131 to project a sound for visually and aurally conveying game related information. Light panels 133 and speakers 32 and/or 131 may also be used to communicate information that may be interpreted by authorized personnel. For example, the light panel may flash or change colors when service is needed.

Peripheral devices 822 may include several device that allow a person to interface with the modularized gaming machine 140 such as, for example: the card reader 31, the bill validator/paper ticket reader 23, a touch screen display 102, etc. The card reader 31 and bill validator/paper ticket reader 23 may each comprise resources for handling and processing configuration indicia such as a microcontroller that converts voltage levels for one or more scanning devices to signals provided to processor 810. In one embodiment, application software for interfacing with peripheral devices 822 may store instructions (such as, for example, how to read indicia from a portable device) in a memory device such as, for example, non-volatile memory, hard drive or a flash memory.

The modularized gaming machine 140 also includes memory 816 which may include, for example, volatile memory (e.g., RAM 809), non-volatile memory 819 (e.g., disk memory, FLASH memory, EPROMs, etc.), unalterable memory (e.g., EPROMs 808), etc. The memory 816 may be configured or designed to store, for example: 1) configuration software 814 such as all the parameters and settings for a game playable on the gaming machine; 2) device drivers/interfaces 842; 3) gaming information and software 843 for allowing the MGC 812 to authenticate/validate data and/or program instructions utilized by the MGC and other peripheral devices; 4) gaming software 814 including programming instructions, which may be stored on the mass storage device 815 (the gaming software may include various audio files, video files and gaming programming instructions not currently being used and invoked in a configuration or reconfiguration for a particular game as well as various types of games); 5) communication transport protocols and software 812 (such as, for example, TCP/IP, USB, Firewire, IEEE1394, Bluetooth, IEEE 802.11x (IEEE 802.11 standards), hiperlan/2, HomeRF, Wi-Fi, etc.) for allowing the gaming machine to communicate with local and non-local devices using such protocols; etc., 6) software for monitoring various security devices 850, 7) software for responding to error conditions determined on the gaming machines, such as, error conditions determined from the monitoring security devices coupled to the modularized gaming machine 140, 8) critical gaming data generated during the play of a game of chance, which may be used to restore the gaming machine to a particular state in the event of a malfunction, such as a power interruption or in the event of a dispute (The critical gaming data may be stored in a non-volatile memory, such as 819.) and 9) system software 813, such as an operating system.

A plurality of device drivers 842 may be stored in memory 816. Example of different types of device drivers may include device drivers for gaming machine components, device drivers for peripheral components 822, etc. Typically, the device drivers 842 utilize a communication protocol of some type that enables communication with a particular physical device. The device driver abstracts the hardware implementation of a device. For example, a device drive may be written for each type of card reader that may be potentially connected to the gaming machine. Examples of communication protocols used to implement the device drivers include Netplex, USB, Serial, Ethernet, Firewire, I/0 debouncer, direct memory map, serial, PCI or parallel. Netplex is a proprietary IGT standard while the others are open standards.

According to a specific embodiment, when one type of a particular device is exchanged for another type of the particular device, a new device driver may be loaded from the memory 816 by the processor 810 to allow communication with the device. For instance, one type of card reader in gaming machine 800 may be replaced with a second type of card reader where device drivers for both card readers are stored in the memory 816. As another example, the base gaming module 100 may be coupled to a first expansion module with a first set of peripheral devices and load device drivers for the first set of peripheral devices. Later, the base gaming module 100 may be coupled to a second expansion module with a second set of peripheral devices different from the first set of peripheral devices and load device drivers for the first set of peripheral devices. The MGC 812 may store device drivers that are compatible with a plurality of expansion modules where the peripheral devices may vary from module to module. Further, MGC 812 may be operable to detect or determine the drivers that are needed for a particular expansion module and load appropriate software, such as needed device drivers.

In some embodiments, the gaming machine 800 may also include various authentication and/or validation components 843 which may be used for authenticating/validating specified gaming machine components such as, for example, hardware components, software components, firmware components, information stored in the gaming machine memory 816, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

In some embodiments, the software units stored in the memory 816 may be upgraded as needed. For instance, when the memory 816 is a hard drive, new games, game options, various new parameters, new settings for existing parameters, new settings for new parameters, device drivers, and new communication protocols may be uploaded to the memory 816 from a remote server, gaming machine or from some other external device. As another example, when the memory 816 includes an optical storage device such as, for example, a CD/DVD disk drive designed or configured to store game options, parameters, and settings, the software stored in the memory may be upgraded by replacing a first optical storage device with a second optical storage device. In yet another example, when the memory 816 uses one or more flash memory 819 or EPROM 808 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

It will be apparent to those skilled in the art that other memory types, including various computer readable media, may be used for storing and executing program instructions pertaining to the operation of the present invention. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter. Additional details about other gaming machine architectures, features and/or components are described, for example, in U.S. patent application Ser. No. 10/040,239, entitled, "GAME DEVELOPMENT ARCHITECTURE THAT DECOUPLES THE GAME LOGIC FROM THE GRAPHICS LOGIC," and published on Apr. 24, 2003 as U.S. Patent Publication No. 2003/0078103, incorporated herein by reference in its entirety for all purposes.

FIGS. 4A and 4B illustrate block diagrams of a security system for embodiments of the modularized gaming machines of the present invention. Various security devices may be employed with this invention. Examples include optical sensors, magnetic sensors, and mechanical sensors. Likewise, various retaining/access mechanisms may be employed in the modularized gaming machine and monitored by the security system. Examples include locks, wires, retaining latches and device receptors.

The retaining or access mechanism that may be monitored by the security system, such as 850, may be provided on a door such as an access hatch in the casing of a base gaming module, a bill stacker door, a CPU security door, a belly door, a drop door and a coupon dispenser door. Depending upon the type of access mechanism employed, the access mechanism may be actuated by opening a door, unengaging a lock, accessing a signal path on wire, opening a retaining latch, or emptying a device receptor. Some security devices/systems that may be used with the present invention are described in U.S. Pat. Nos. 6,575,833 and 6,773,348 each titled "Battery Powered Gaming Machine Security Monitoring System," by Stockdale, et al., filed respectively on Jan. 4, 2000 and Oct. 9, 2001, each of which is incorporated in its entirety and for all purposes.

In FIG. 4A, the base gaming module includes a master gaming controller that is configured to control a game of chance played using the base gaming module. The base gaming module may be provided with logic for tilt and error handling 844, logic for monitoring one or more security devices 850 and security configuration information (not shown) regarding one or more expansion modules that may be coupled to the base gaming module. In one embodiment, the tilt and error handling 844, the security system or systems 850 and security configuration information may be provided as components of the master gaming controller (MGC) 812. These components may also be provided on security devices separate from the MGC 812.

In FIG. 4A, a modular gaming machine comprises a base gaming module and one through N expansion modules (N being a variable number). The security systems on the base gaming module including the tilt and error handling 844 and security system 850 may be dynamically configured to monitor and respond to information from 1) signal paths 1-3, such as information from security device 870, 2) signal path 4, from a security system 880 in expansion module 1 that is coupled to security devices along signal paths 5-7 within the expansion module 1 and 3) signal paths M−2 to M, such as from security device 871 in expansion module N.

In one embodiment, the security system 880 may monitor the signal paths 5-7 and the security system 850 may not directly monitor these security devices. The security system 880 may be able to determine security events generated along these signal paths and when an error condition or other security event is detected send a message that is understood by the security system 850. One advantage of this approach is that the amount wiring between the base gaming module and the expansion module may be reduced. Another advantage is that the base gaming module may not need to be programmed with details of the security devices and associated circuitry that may be needed to recognize information from signal paths 5-7.

In FIG. 4B, the modular gaming machine again comprises a master gaming controller 812 including tilt and error handling 844 and a security system 850 that may be designed to monitor security information from 1 through N expansion modules. The base gaming module is configured to monitor signal paths 1-M on base module and expansion modules 1-N. In this embodiment, the security system on the base gaming module may not be dynamically configurable. Thus, as example, when expansion module 1 is not coupled to the base gaming module, a signal mechanism 860, such as a logic device, may be used to generate non error-condition, on signal paths 4-6, such that a security event is not triggered on the base gaming module. Further, as another example, when expansion module N is not coupled to the base gaming module, then a mechanical jumper 862 may be used to generate a non-error condition on signal paths M−2 through M.

FIG. 5 illustrates a flow diagram for a method 500 of initializing game play on a modularized gaming machine using a dynamical configurable security system for one embodiment of the present invention. In one invention, in 502, the modularized gaming machine may be powered-up and a boot sequence may be initiated. In 504, the base gaming module may attempt to determine the configuration of the modularized gaming machine and whether any expansion modules are coupled to the base gaming module.

In 506, the base gaming module may configure the security monitoring system. The configuration may include monitoring particular signal paths for security information in a specific format where the security information and the format of the security information on a particular signal path may vary depending on the configuration of the expansion module that is coupled to the base gaming module. The format may include expected signal and voltage levels that are sent along the path and expected information such that the security system may properly recognize security information that may be sent along a particular security path.

In 508, tilt and error handling conditions may be configured. The tilt and error handling conditions may specify responses to security information that is received along the signal paths, such as entering a tilt state and sending a "call attendant" message. In 510, the security system 510 may be initialized with diagnostics to check that each signal path is operating correctly. The security system 510 may send out or receive diagnostic information, such as test signals. In addition, when the base gaming module or an expansion module is configured with a security system that is operable to provide security when components are not coupled to an external power source, the security system may check to determine whether any security events have occurred in "power-off" situations, such as during transport. In 512, when the security system has been initialized and is operating properly, then the modularized gaming machine may continue any additional power-up routines it performs and reach a state where it is ready to provide game play.

FIG. 6 shows a perspective view of a gaming machine 2 in accordance with a specific embodiment of the present invention. Any of the gaming devices and gaming functions described with respect to FIG. 6 can be incorporated in the gaming modules of the modularized gaming machine described above with respect to FIGS. 1A-5. As illustrated in the example of FIG. 6, machine 2 includes a main cabinet 4, which generally surrounds the machine interior and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. According to a specific embodiment, the devices may be controlled by code executed by a master gaming controller housed inside the main cabinet 4 of the machine 2. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may execute game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 6, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 6. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller 46) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758, 828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925, 098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Returning to the example of FIG. 6, when a user wishes to play the gaming machine 2, he or she inserts cash through the coin acceptor 28 or bill validator 30. Additionally, the bill validator may accept a printed ticket voucher, which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

FIG. 7 shows a block diagram illustrating components of a gaming system 900 which may be used for implementing various aspects of the present invention. In FIG. 7, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 7, only one instance of each function is shown. The functions of the components may be combined. For example, a single device may comprise the game play interface 911 and include trusted memory devices or sources 909. Each of the described components may be incorporated various embodiments of the modularized gaming machines described with respect to FIGS. 1A-5.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 7. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, “Gaming Terminal Data Repository and Information System,” filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of the present invention may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with the present invention is describes in previously incorporated U.S. Pat. No. 6,264, 561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may be used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 7. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of the present invention.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A base module for a modular gaming machine, the base module comprising:
- an outer housing;
- a master gaming controller contained within the outer housing, the master gaming controller including a security system;
- a first mechanical interface, the first mechanical interface configured to connect an first expansion module to the outer housing; and
- one or more first signal paths configured to communicatively connect the master gaming controller with a first logic device in the first expansion module when the first expansion module is connected with the outer housing via the first mechanical interface, wherein the master gaming controller is configured to:
  - determine that the first expansion module has been communicatively connected with the gaming controller via the one or more first signal paths,
  - interrogate, via the one or more first signal paths, the first logic device in the first expansion module to determine at least a portion of the security configuration of the first expansion module,
  - receive, responsive to the interrogation of the first logic device and from the first logic device, first security configuration information from the first expansion module via the one or more first signal paths, and
  - configure the security system to account for the security configuration of the first expansion module based on the received first security configuration information.

2. The base module of claim 1, the base module further comprising:
- a second mechanical interface, the second mechanical interface configured to connect a second expansion module to the outer housing; and
- one or more second signal paths configured to communicatively connect the master gaming controller with a second logic device in the second expansion module when the second expansion module is connected with the outer housing via the second mechanical interface, wherein the master gaming controller is further configured to:
  - determine that the second expansion module has been communicatively connected with the gaming controller via the one or more second signal paths,
  - interrogate, via the one or more second signal paths, the second logic device in the second expansion module to determine at least a portion of the security configuration of the second expansion module,
  - receive, responsive to the interrogation of the second logic device and from the second logic device, second security configuration information from the second expansion module via the one or more second signal paths, and
  - configure the security system to account for the security configuration of the second expansion module based on the received second security configuration information.

3. The base module of claim 1, wherein:
- the first logic device is associated with a first peripheral of the first expansion module; and
- the master gaming controller is further configured to:
  - interrogate, via the one or more first signal paths, one or more additional first logic devices in the first expansion module to determine further portions of the security configuration of the first expansion module, each additional first logic device associated with a different peripheral of the first expansion module, receive, responsive to the interrogation of the one or more additional first logic devices and from the one or more additional first logic devices, additional first security configuration information from the first expansion module via the one or more first signal paths, and further configure the security system to further account for the security configuration of the first expansion module based on the received first security configuration information.

4. The base module of claim 1, wherein the first security configuration information includes:

information indicating security devices included in the first expansion module; and potential error conditions associated with the security devices included in the first expansion module.

5. The base module of claim 1, the base module further comprising:

a storage device, the storage device storing a database including a record associating identification information for the first expansion module with:

information indicating security devices included in the first expansion module; and potential error conditions associated with the security devices included in the first expansion module, wherein:

the first security configuration information includes the identification information for the first expansion module, and the master gaming controller is further configured to retrieve the information indicating the security devices included in the first expansion module and the potential error conditions associated with the security devices included in the first expansion module from the database.

6. The base module of claim 1, wherein the master gaming controller is further configured to verify the authenticity of the first expansion module.

7. The base module of claim 6, wherein the master gaming controller verifies the authenticity of the first expansion module using public-private encryption key pairs.

8. A modular gaming machine, the modular gaming machine comprising:

a base module including:

an outer housing, a master gaming controller contained within the outer housing, the master gaming controller including a security system, a first mechanical interface, the first mechanical interface configured to connect an first expansion module to the outer housing, and one or more first signal paths configured to communicatively connect the master gaming controller with a first logic device in the first expansion module when the first expansion module is connected with the outer housing via the first mechanical interface, wherein the master gaming controller is configured to:

determine that the first expansion module has been communicatively connected with the gaming controller via the one or more first signal paths, interrogate, via the one or more first signal paths, the first logic device in the first expansion module to determine at least a portion of the security configuration of the first expansion module, receive, responsive to the interrogation of the first logic device and from the first logic device, first security configuration information from the first expansion module via the one or more first signal paths, and configure the security system to account for the security configuration of the first expansion module based on the received first security configuration information; and the first expansion module, the first expansion module including the first logic device.

9. The modular gaming machine of claim 8, the base module further comprising:

a second mechanical interface, the second mechanical interface configured to connect a second expansion module to the outer housing; and one or more second signal paths configured to communicatively connect the master gaming controller with a second logic device in the second expansion module when the second expansion module is connected with the outer housing via the second mechanical interface, wherein the master gaming controller is further configured to:

determine that the second expansion module has been communicatively connected with the gaming controller via the one or more second signal paths, interrogate, via the one or more second signal paths, the second logic device in the second expansion module to determine at least a portion of the security configuration of the second expansion module, receive, responsive to the interrogation of the second logic device and from the second logic device, second security configuration information from the second expansion module via the one or more second signal paths, and configure the security system to account for the security configuration of the second expansion module based on the received second security configuration information.

10. The modular gaming machine of claim 9, further comprising the second expansion module, the second expansion module including the second logic device.

11. The modular gaming machine of claim 8, wherein:

the first logic device is associated with a first peripheral of the first expansion module; and the master gaming controller is further configured to:

interrogate, via the one or more first signal paths, one or more additional first logic devices in the first expansion module to determine further portions of the security configuration of the first expansion module, each additional first logic device associated with a different peripheral of the first expansion module, receive, responsive to the interrogation of the one or more additional first logic devices and from the one or more additional first logic devices, additional first security configuration information from the first expansion module via the one or more first signal paths, and further configure the security system to further account for the security configuration of the first expansion module based on the received first security configuration information.

12. The modular gaming machine of claim 8, wherein the first security configuration information includes:

information indicating security devices included in the first expansion module; and potential error conditions associated with the security devices included in the first expansion module.

13. The modular gaming machine of claim 8, the base module further comprising:

a storage device, the storage device storing a database including a record associating identification information for the first expansion module with:

information indicating security devices included in the first expansion module; and potential error conditions associated with the security devices included in the first expansion module, wherein:

the first security configuration information includes the identification information for the first expansion module, and the master gaming controller is further configured to retrieve the information indicating the security devices included in the first expansion module and the potential error conditions associated with the security devices included in the first expansion module from the database.

14. The modular gaming machine of claim 8, wherein the master gaming controller is further configured to verify the authenticity of the first expansion module.

15. The modular gaming machine of claim 14, wherein the master gaming controller verifies the authenticity of the first expansion module using public-private encryption key pairs.

16. A method of configuring a modular gaming machine, the method comprising:

connecting a first expansion module with a first mechanical interface of the modular gaming machine, the modular gaming machine including a master gaming controller and one or more first signal paths configured to communicatively connect the master gaming controller with a first logic device in the first expansion module when the first expansion module is connected with the first mechanical interface;

determining that the first expansion module has been communicatively connected with the gaming controller via the one or more first signal paths;

interrogating, via the one or more first signal paths, the first logic device in the first expansion module to determine at least a portion of the security configuration of the first expansion module;

receiving, responsive to the interrogation of the first logic device and from the first logic device, first security configuration information from the first expansion module via the one or more first signal paths; and configuring the security system to account for the security configuration of the first expansion module based on the received first security configuration information.

17. The method of claim 16, further comprising:

connecting a second expansion module with a second mechanical interface of the modular gaming machine, the modular gaming machine further including one or more second signal paths configured to communicatively connect the master gaming controller with a second logic device in the second expansion module when the second expansion module is connected with the second mechanical interface;

determining that the second expansion module has been communicatively connected with the gaming controller via the one or more second signal paths;

interrogating, via the one or more second signal paths, the second logic device in the second expansion module to determine at least a portion of the security configuration of the second expansion module;

receiving, responsive to the interrogation of the second logic device and from the second logic device, second security configuration information from the second expansion module via the one or more second signal paths; and configuring the security system to account for the security configuration of the second expansion module based on the received second security configuration information.

18. The method of claim 16, further comprising:

interrogating, via the one or more first signal paths, one or more additional first logic devices in the first expansion module to determine further portions of the security configuration of the first expansion module, each additional first logic device associated with a different peripheral of the first expansion module;

receiving, responsive to the interrogation of the one or more additional first logic devices and from the one or more additional first logic devices, additional first security configuration information from the first expansion module via the one or more first signal paths; and configuring the security system to further account for the security configuration of the first expansion module based on the received first security configuration information.

19. The method of claim 16, wherein the first security configuration information includes:

information indicating security devices included in the first expansion module; and potential error conditions associated with the security devices included in the first expansion module.

20. The method of claim 16, further comprising:

storing, in a database accessible to the master gaming controller:

information indicating security devices included in the first expansion module, and potential error conditions associated with the security devices included in the first expansion module, wherein:

the first security configuration information includes the identification information for the first expansion module, and the master gaming controller is further configured to retrieve the information indicating the security devices included in the first expansion module and the potential error conditions associated with the security devices included in the first expansion module from the database.

* * * * *